United States Patent
Tie et al.

(10) Patent No.: US 12,531,845 B2
(45) Date of Patent: Jan. 20, 2026

(54) IDENTITY AUTHENTICATION METHOD, AUTHENTICATION ACCESS CONTROLLER, REQUEST DEVICE, STORAGE MEDIUM, PROGRAM, AND PROGRAM PRODUCT

(71) Applicant: CHINA IWNCOMM CO., LTD., Xi'an (CN)

(72) Inventors: Manxia Tie, Xi'an (CN); Jun Cao, Xi'an (CN); Xiaolong Lai, Xi'an (CN); Xiaorong Zhao, Xi'an (CN); Qin Li, Xi'an (CN); Bianling Zhang, Xi'an (CN); Liang Lu, Xi'an (CN)

(73) Assignee: CHINA IWNCOMM CO., LTD., Xi'an (CN)

( * ) Notice: Subject to any disclaimer, the term of this patent is extended or adjusted under 35 U.S.C. 154(b) by 291 days.

(21) Appl. No.: 18/259,150

(22) PCT Filed: Dec. 21, 2021

(86) PCT No.: PCT/CN2021/140101
§ 371 (c)(1),
(2) Date: Jun. 23, 2023

(87) PCT Pub. No.: WO2022/135399
PCT Pub. Date: Jun. 30, 2022

(65) Prior Publication Data
US 2024/0056433 A1   Feb. 15, 2024

(30) Foreign Application Priority Data

Dec. 26, 2020 (CN) ...................... 202011569178.X

(51) Int. Cl.
*H04L 9/40* (2022.01)
(52) U.S. Cl.
CPC ................................ *H04L 63/08* (2013.01)

(58) Field of Classification Search
None
See application file for complete search history.

(56) References Cited

U.S. PATENT DOCUMENTS

2008/0072047 A1* 3/2008 Sarikaya ............... H04L 9/0836
380/247
2012/0082312 A1* 4/2012 Liu ........................ H04L 9/0863
380/262

(Continued)

FOREIGN PATENT DOCUMENTS

| CN | 101635710 A | 1/2010 |
|---|---|---|
| CN | 106603234 A | 4/2017 |

(Continued)

OTHER PUBLICATIONS

Notice of Allowance of the European application No. 21909395.2, issued on Nov. 6, 2024. 72 pages.

(Continued)

*Primary Examiner* — Scott B Christensen
(74) *Attorney, Agent, or Firm* — Cooper Legal Group, LLC

(57) ABSTRACT

Disclosed is an identity authentication method. When a request device and an authentication access controller perform identity verification on the basis of an authentication mechanism of a pre-shared key, identity information of a verified party is transmitted in the form of a ciphertext, thereby preventing the identity information of the verified party from being directly exposed during transmission, and ensuring that an attacker cannot obtain private and sensitive information. Two-way or one-way identity authentication between the authentication access controller and the request device is realized, while the confidentiality of entity identity related information is ensured, thereby laying the foundation for ensuring that a user accessing a network is legitimate and/or the network accessed by the user is legitimate.

(Continued)

Moreover, the dictionary brute-force attack resistance or quantum computation attack resistance during authentication is enhanced in conjunction with key exchange computation and by means of ingenious detail designs. Also disclosed are an authentication access controller, a request device, a storage medium, a program, and a program product.

20 Claims, 6 Drawing Sheets

(56) References Cited

U.S. PATENT DOCUMENTS

| | | | |
|---|---|---|---|
| 2013/0212390 | A1 | 8/2013 | Du et al. |
| 2017/0310475 | A1 | 10/2017 | Hu et al. |
| 2021/0058255 | A1* | 2/2021 | Martins ............... H04L 9/14 |
| 2021/0092607 | A1* | 3/2021 | Klinkner ............. H04L 9/14 |
| 2021/0119775 | A1* | 4/2021 | Klinkner ........... H04L 9/0844 |
| 2022/0286442 | A1* | 9/2022 | Gan ................. H04L 9/0844 |

FOREIGN PATENT DOCUMENTS

| | | |
|---|---|---|
| CN | 107483429 A | 12/2017 |
| CN | 108111467 A | 6/2018 |
| EP | 2234366 A1 | 9/2010 |
| JP | 2013503510 A | 1/2013 |
| JP | 2017517915 A | 6/2017 |
| JP | 2017529807 A | 10/2017 |
| WO | 2008113952 A2 | 9/2008 |
| WO | 2019028698 A1 | 2/2019 |

OTHER PUBLICATIONS

International Search Report in the international application No. PCT/CN2021/140101, mailed on Mar. 15, 2022. 2 pages.
English translation of the Written Opinion of the International Search Authority in the international application No. PCT/CN2021/140101, mailed on Mar. 15, 2022. 4 pages.
Supplementary European Search Report in the European application No. 21909395.2, mailed on May 3, 2024. 5 pages.
Notice of Allowance of the Japanese application No. 2023-539134, issued on Jul. 2, 2024. 5 pages with English translation.

* cited by examiner

IDENTITY AUTHENTICATION METHOD, AUTHENTICATION ACCESS CONTROLLER, REQUEST DEVICE, STORAGE MEDIUM, PROGRAM, AND PROGRAM PRODUCT

CROSS-REFERENCE TO RELATED APPLICATIONS

The present application is based on and claims priority to Chinese Patent Application No. 202011569178.x, filed on Dec. 26, 2020 and entitled "Identity Authentication Method and Device", the contents of which is hereby incorporated by reference in its entirety.

TECHNICAL FIELD

The present disclosure relates to the technical field of network communication security, and particularly to an identity authentication method, an authentication access controller, a requesting device, a storage medium, a program, and a program product.

BACKGROUND

In a communication network, a requesting device may access the network through an authentication access controller. In some cases where security requirements are relatively high, the authentication access controller needs to authenticate the identity of the requesting device, and sometimes the requesting device also needs to authenticate the identity of the authentication access controller, to ensure at least one of the following: the requesting device accessing the network is a legal user, or the network that is to be accessed by the requesting device is a legal network. Furthermore, node-to-node transmission in blockchain technology also requires that a trust relationship is established between different nodes, so that identity authentication performed on nodes is also very important.

Currently, the requesting device and the authentication access controller may use a pre-shared key authentication mechanism to perform identity verification. However, identity information of an entity is typically not carried in this process. That is, it is determined whether an opposite party is legal only on the basis of verification of a pre-shared key of the opposite party, but it is not clear who the opposite party actually is. In essence, the identity of the opposite party is not really authenticated. According to some other solutions, although identity information is also carried during verification of a pre-shared key of an opposite party, identity information of the entity is often exposed directly during authentication message transmission. The identity information of the entity includes some private or sensitive information of the entity, such as an identification card number, a home address, bank card information, etc., if the private or sensitive information is intercepted by an attacker and is used thereby to perform illegal activities, the consequences could be terrible.

During identity authentication of the requesting device and the network, if identity information of the requesting device is intercepted by an attacker for illegal purposes, or identity information of the network is intercepted by an attacker for illegal purposes, severe security risks are posed to an authentication access controller, the requesting device, and the network.

SUMMARY

To address the above technical problem, provided in embodiments of the present disclosure are an identity authentication method, an authentication access controller, a requesting device, a storage medium, a program, and a program product. Mutual or unilateral identity authentication is performed between an authentication access controller and a requesting device by using a pre-shared key, while confidentiality of identity and related information of entities is ensured, thereby ensuring that at least one of the following: a user accessing a network is a legal user, or a network that is to be accessed by a user is a legal network. Key exchange calculation such as Diffie-Hellman (DH), etc., is selected and employed, and ingenious detail design is implemented, thereby enhancing the capability of the authentication process to resist quantum computation attacks or dictionary brute force attacks.

Provided in the embodiments of the present disclosure are the following technical solutions.

According to a first aspect, an embodiment of the present disclosure provides an identity authentication method. The method includes the following operations.

A requesting device sends a first identity ciphertext message to an authentication access controller, where the first identity ciphertext message includes a first identity information ciphertext generated by using a message encryption key to encrypt information including an identifier of the requesting device.

The authentication access controller decrypts the first identity information ciphertext using the message encryption key to obtain the identifier of the requesting device, determines a pre-shared key with the requesting device based on the identifier of the requesting device, and calculates an identity authentication key based on information including the pre-shared key and a first key.

The authentication access controller sends a second identity ciphertext message to the requesting device, where the second identity ciphertext message includes a second identity information ciphertext and a second key exchange parameter of the authentication access controller, the second identity information ciphertext being generated by the authentication access controller by using the message encryption key to encrypt information including an identifier of the authentication access controller, and the second key exchange parameter of the authentication access controller being generated by using the identity authentication key to encrypt information including a second temporary public key generated by the authentication access controller.

The requesting device decrypts the second identity information ciphertext using the message encryption key to obtain the identifier of the authentication access controller, determines a pre-shared key with the authentication access controller based on the identifier of the authentication access controller, and calculates the identity authentication key based on information including the pre-shared key and the first key.

The requesting device sends a first authentication message to the authentication access controller, where the first authentication message includes a second key exchange parameter of the requesting device, the second key exchange parameter of the requesting device being generated by the requesting device by using the identity authentication key to encrypt information including a second temporary public key generated by the requesting device.

Where at least one of the following applies:
when the requesting device is used as a verified party, the first authentication message further includes a first identity authentication code generated by the requesting device by using the identity authentication key to perform calculation on first specified data including the identifier and a second key of the requesting device, the second key being generated by the requesting device by performing key exchange calculation on a second temporary private key corresponding to the second temporary public key of the requesting device and a second temporary public key recovered from the second key exchange parameter of the authentication access controller; the authentication access controller receives the first authentication message, verifies the first identity authentication code using the identity authentication key and the first specified data, and determines an identity authentication result of the requesting device according to a verification result; or when the authentication access controller is used as a verified party, the authentication access controller sends a second authentication message to the requesting device, where the second authentication message includes a second identity authentication code generated by the authentication access controller by using the identity authentication key to perform calculation on second specified data including the identifier and a second key of the authentication access controller, the second key being generated by the authentication access controller by performing the key exchange calculation on a second temporary private key corresponding to the second temporary public key of the authentication access controller and the second temporary public key recovered from the second key exchange parameter of the requesting device; and the requesting device receives the second authentication message, verifies the second identity authentication code using the identity authentication key and the second specified data, and determines an identity authentication result of the authentication access controller according to a verification result.

According to a second aspect, an embodiment of the present disclosure provides an authentication access controller, which includes a receiving portion, a calculation portion, a sending portion, and a verification portion.

The receiving portion is configured to receive a first identity ciphertext message sent by a requesting device, where the first identity ciphertext message includes a first identity information ciphertext generated by using a message encryption key to encrypt information including an identifier of the requesting device.

The calculation portion is configured to decrypt the first identity information ciphertext using the message encryption key to obtain the identifier of the requesting device, determine a pre-shared key with the requesting device based on the identifier of the requesting device, and calculate an identity authentication key based on information including the pre-shared key and a first key.

The sending portion is configured to send a second identity ciphertext message to the requesting device, where the second identity ciphertext message includes a second identity information ciphertext and a second key exchange parameter of the authentication access controller, the second identity information ciphertext being generated by the authentication access controller by using the message encryption key to encrypt information including an identifier of the authentication access controller, and the second key exchange parameter of the authentication access controller being generated by using the identity authentication key to encrypt information including a second temporary public key generated by the authentication access controller.

The receiving portion is further configured to receive a first authentication message sent by the requesting device, where the first authentication message includes a second key exchange parameter of the requesting device, the second key exchange parameter of the requesting device being generated by the requesting device by using the identity authentication key to encrypt information including a second temporary public key generated by the requesting device, and where at least one of the following applies:

when the requesting device is used as a verified party, the first authentication message further includes a first identity authentication code generated by the requesting device by using the identity authentication key to perform calculation on first specified data including the identifier and a second key of the requesting device, the second key being generated by the requesting device by performing key exchange calculation on a second temporary private key corresponding to the second temporary public key of the requesting device and a second temporary public key recovered from the second key exchange parameter of the authentication access controller; the verification portion is configured to verify the first identity authentication code in the first authentication message by using the identity authentication key and the first specified data, and determine an identity authentication result of the requesting device according to a verification result; or when the authentication access controller is used as a verified party, the sending portion is further configured to send a second authentication message to the requesting device, where the second authentication message includes a second identity authentication code generated by the authentication access controller by using the identity authentication key to perform calculation on second specified data including the identifier and a second key of the authentication access controller, the second key being generated by the authentication access controller by performing the key exchange calculation on a second temporary private key corresponding to the second temporary public key of the authentication access controller and the second temporary public key recovered from the second key exchange parameter of the requesting device.

According to a third aspect, an embodiment of the present disclosure provides a requesting device, which includes a sending portion, a receiving portion, a calculation portion, and a verification portion.

The sending portion is configured to send a first identity ciphertext message to an authentication access controller, where the first identity ciphertext message includes a first identity information ciphertext generated by using a message encryption key to encrypt information including an identifier of the requesting device.

The receiving portion is configured to receive a second identity ciphertext message sent by the authentication access controller, where the second identity ciphertext message includes a second identity information ciphertext and a second key exchange parameter of the authentication access controller, the second identity information ciphertext being generated by the authentication access controller by using the message encryption key to encrypt information including an identifier of the authentication access controller, and the second key exchange parameter of the authentication access controller being generated by using the identity authentication key to encrypt information including a second temporary public key generated by the authentication access controller.

The calculation portion is configured to decrypt the second identity information ciphertext using the message encryption key to obtain the identifier of the authentication access controller, determine a pre-shared key with the authentication access controller based on the identifier of the authentication access controller, and calculate the identity authentication key based on information including the pre-shared key and a first key.

The sending portion is further configured to send a first authentication message to the authentication access controller, where the first authentication message includes a second key exchange parameter of the requesting device, the second key exchange parameter of the requesting device being generated by the requesting device by using the identity authentication key to encrypt information including a second temporary public key generated by the requesting device.

Where at least one of the following applies:

when the requesting device is used as a verified party, the first authentication message further includes a first identity authentication code generated by the requesting device by using the identity authentication key to perform calculation on first specified data including the identifier and a second key of the requesting device, the second key being generated by the requesting device by performing key exchange calculation on a second temporary private key corresponding to the second temporary public key of the requesting device and a second temporary public key recovered from the second key exchange parameter of the authentication access controller; or when the authentication access server is used as a verified party, the receiving portion is further configured to receive a second authentication message sent by the authentication access controller, where the second authentication message includes a second identity authentication code generated by the authentication access controller by using the identity authentication key to perform calculation on second specified data including the identifier and a second key of the authentication access controller, the second key being generated by the authentication access controller by performing the key exchange calculation on a second temporary private key corresponding to the second temporary public key of the authentication access controller and the second temporary public key recovered from the second key exchange parameter of the requesting device; the verification portion is configured to use the identity authentication key and the second specified data to verify the second identity authentication code in the second authentication message, and determine an identity authentication result of the authentication access controller according to a verification result.

In a fourth aspect, an authentication access controller is further provided in an embodiment of the present disclosure. The authentication access controller includes:

a first processor; and a first memory for storing instructions executable by the first processor, where the first processor is configured to invoke instructions stored by the first memory to perform the operations performed by the authentication access controller described in the first aspect.

In a fifth aspect, a requesting device is further provided in an embodiment of the present disclosure. The requesting device includes:

a second processor; and a second memory for storing instructions executable by the second processor, where the second processor is configured to invoke instructions stored by the second memory to perform the operations performed by the requesting device described in the first aspect.

According to a sixth aspect, also provided in an embodiment of the present disclosure is a computer-readable storage medium, having a computer program stored thereon, the computer program performing, when executed by a processor, operations performed by the authentication access controller or the requesting device in the identity authentication method according to the first aspect.

According to a seventh aspect, also provided in an embodiment of the present disclosure is a computer program, including computer-readable code, where when the computer-readable code is run in a computer device, a processor in the computer device performs operations performed by the authentication access controller or the requesting device in the identity authentication method according to the first aspect.

According to an eighth aspect, also provided in an embodiment of the present disclosure is a computer program product, including computer program instructions, the computer program instructions causing a computer to perform operations performed by the authentication access controller or the requesting device in the identity authentication method according to the first aspect.

It can be seen from the above technical solutions that when a requesting device and an authentication access controller use a pre-shared key authentication mechanism to perform identity verification, identity information of the requesting device and the authentication access controller is transmitted in the form of a ciphertext during message transmission, so as to ensure that when a verifying party uses the pre-shared key authentication mechanism to perform identity verification, identity information of an opposite party can be acquired by decrypting an identity information ciphertext of the opposite party, so that real identity authentication is performed on a verified party. The identity information transmitted between the requesting device and the authentication access controller is present in the form of a ciphertext, so that the identity information of the verified party is prevented from being exposed during transmission, thereby ensuring that an attacker could not acquire private or sensitive information and use the same for illegal purposes. Mutual or unilateral identity authentication is performed between the authentication access controller and the requesting device by using a pre-shared key, while confidentiality of identity related information of entities is ensured, thereby laying the foundation for ensuring that a user accessing a network is legal and/or a network to be accessed by a user is legal.

BRIEF DESCRIPTION OF THE DRAWINGS

In order to describe the technical solutions in the embodiments of the present disclosure or in the related art more clearly, accompanying drawings to be used for description of the embodiments or the related art will be briefly introduced below. Obviously, the accompanying drawings in the following description are merely some embodiments of the present disclosure. Those of ordinary skill in the art can further obtain other accompanying drawings according to these accompanying drawings without the exercise of inventive effort.

DETAILED DESCRIPTION

Figure 1:
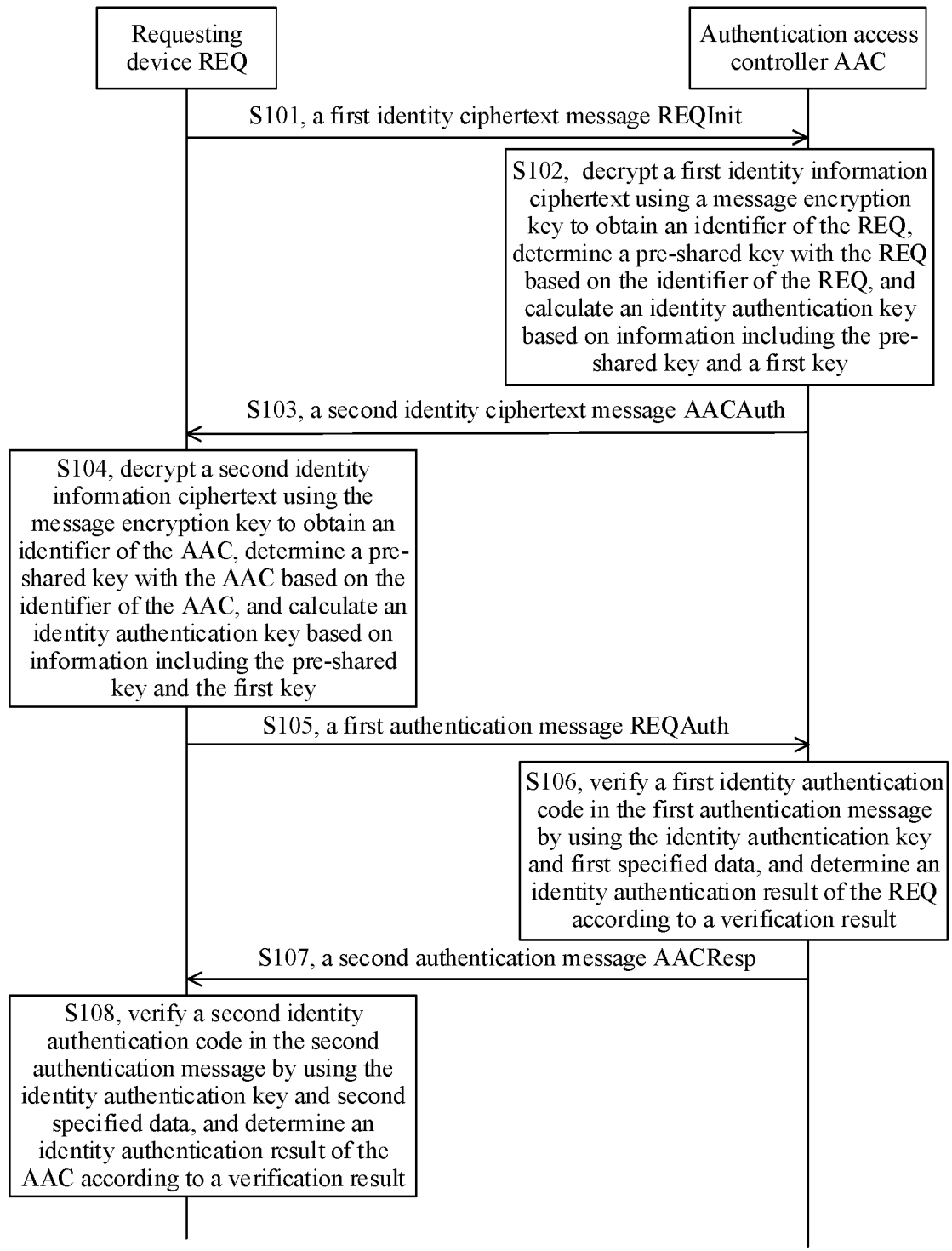
FIG. 1 is a schematic diagram of an identity authentication method according to an embodiment of the present disclosure.

In a communication network, a requesting device may access the network via an authentication access controller. In order to ensure that the requesting device accessing the network is a legal user and/or the network that a user requests to access is a legal network, mutual or unilateral identity authentication typically needs to be performed between the authentication access controller and the requesting device.

For example, in a scenario where the requesting device accesses a wireless network by means of the authentication access controller, the requesting device may be a terminal device such as a mobile phone, a personal digital assistant (PDA), or a tablet, and the authentication access controller may be a wireless access point. In a scenario where the requesting device accesses a wired network by means of the authentication access controller, the requesting device may be a terminal device such as a desktop, or a notebook computer, and the authentication access controller may be a switch, a router or the like. In a scenario where the requesting device accesses the 4th/5th Generation mobile communication technology (4G/5G) network through the authentication access controller, the requesting device may be a mobile phone, and the authentication access controller may be a base station. Certainly, the present disclosure is likewise applicable to various data communication scenarios such as other wired networks, near field communication networks, and the like.

During identity authentication performed on a requesting device, the requesting device needs to provide identity information thereof, so that an authentication access controller performs identity authentication on the requesting device. During identity authentication performed on an authentication access controller, the authentication access controller also needs to provide identity information thereof, so that a requesting device performs identity authentication on the authentication access controller. For example, identity information of an entity may carry private information such as an identification card number, a home address, bank card information, a geographic location, information about an organ thereof, etc. If an attacker intercepts identity information of a requesting device or an authentication access controller, and uses the same for illegal purposes, severe security risks are posed to the authentication access controller, the requesting device, or even a network.

To address the above technical problem, an embodiment of the present disclosure provides an identity authentication method. A requesting device sends a first identity ciphertext message to an authentication access controller. The first identity ciphertext message includes a first identity information ciphertext generated by using a message encryption key to encrypt information including an identifier of the requesting device. The authentication access controller uses the message encryption key to decrypt the first identity information ciphertext to obtain the identifier of the requesting device, determines a pre-shared key with the requesting device based on the identifier of the requesting device, and calculates an identity authentication key based on information including the pre-shared key and a first key. The first key is negotiated and generated by the requesting device and the authentication access controller. The authentication access controller sends a second identity ciphertext message to the requesting device. The second identity ciphertext message includes a second identity information ciphertext and a second key exchange parameter of the authentication access controller. The second identity information ciphertext is generated by the authentication access controller by using the message encryption key to encrypt information including an identifier of the authentication access controller. The second key exchange parameter of the authentication access controller is generated by using the identity authentication key to encrypt information including a second temporary public key generated by the authentication access controller. The requesting device uses the message encryption key to decrypt the second identity information ciphertext to obtain the identifier of the authentication access controller, determines a pre-shared key with the authentication access controller based on the identifier of the authentication access controller, and calculates the identity authentication key based on information including the pre-shared key and the first key. The requesting device sends a first authentication message to the authentication access controller. The first authentication message includes a second key exchange parameter of the requesting device. The second key exchange parameter of the requesting device is generated by the requesting device by using the identity authentication key to encrypt information including the second temporary public key generated by the requesting device. When the requesting device is used as a verified party, the first authentication message further includes a first identity authentication code generated by using the identity authentication key to perform calculation on first specified data including the identifier and a second key of the requesting device. The second key is generated by performing key exchange calculation (e.g., a Diffie-Hellman (DH) key exchange algorithm) on a second temporary private key corresponding to the second temporary public key of the requesting device and a second temporary public key recovered from the second key exchange parameter of the authentication access controller. The authentication access controller receives the first authentication message, uses the identity authentication key and the first specified data to verify the first identity authentication code in the first authentication message, and determines an identity authentication result of the requesting device according to the verification result. When the authentication access controller is used as a verified party, the authentication access controller sends a second authentication message to the requesting device. The second authentication message includes a second identity authentication code generated by using the identity authentication key to perform calculation on second specified data including the identifier and a second key of the authentication access controller. The second key is generated by performing the key exchange calculation on a second temporary private key corresponding to the second temporary public key of the authentication access controller and the second temporary public key recovered from the second key exchange parameter of the requesting device. The requesting device receives the second authentication message, uses the identity authentication key and the second specified data to verify the second identity authentication code in the second authentication message, and determines an identity authentication result of the authentication access controller according to a verification result.

It can be seen that when the requesting device and the authentication access controller use a pre-shared key authentication mechanism to perform identity verification, identity information of the requesting device and the authentication access controller is transmitted in the form of a ciphertext during message transmission, so as to ensure that when a verifying party uses the pre-shared key authentication mechanism to perform identity verification, identity information of an opposite party can be acquired by decrypting an identity information ciphertext of the opposite party, so that real identity authentication is performed on a verified party. The identity information transmitted between the requesting device and the authentication access controller is present in the form of a ciphertext, so that the identity information of the verified party is prevented from being exposed during transmission, thereby ensuring that an attacker could not acquire private or sensitive information and use the same for illegal purposes. Mutual or unilateral identity authentication is performed between an authentication access controller and a requesting device by using a pre-shared key, while confidentiality of identity related information of entities is ensured, thereby laying the foundation for ensuring that a user accessing a network is a legal user and/or a network to be accessed by a user is a legal network.

It should be noted that the identity authentication method provided in the embodiment of the present disclosure can achieve not only mutual identity authentication (MIA) between an authentication access controller and a requesting device, but also REQ Authentication with an Unauthenticated AAC (RADA) and AAC Authentication with an Unauthenticated REQ (AAUR).

For ease of description, in the embodiment of the present disclosure, the identity authentication method provided in the embodiment of the present disclosure will be described by taking a requesting device (REQuester, REQ) and an authentication access controller (AAC) as examples.

The REQ is an end point participating in an identity authentication process, is connected to the AAC, and accesses a service provided by the AAC. The AAC is another end point participating in the identity authentication process, is connected to the REQ, and provides the service. Before a pre-shared key is used to achieve the mutual or unilateral identity authentication between the REQ and the AAC, the valid pre-shared key (PSK) is present between the REQ and the AAC. The PSK is the same key preconfigured or allocated by the REQ and the AAC, and the REQ and the AAC have IDs capable of identifying the REQ and the AAC.

It should be noted that in an identity authentication method provided in an embodiment of the present disclosure, either one of an AAC and a REQ may be used as a verified party, and the other may be used as a corresponding verifying party. The verifying party is used to perform identity authentication on the verified party.

In an implementation manner, the REQ is used as a verified party, and the AAC is used as a corresponding verifying party; and the AAC is used as a verified party, and the REQ is used as a corresponding verifying party. The AAC is used to verify legality of identity of the REQ, and the REQ is used to verify legality of identity of the AAC. That is, mutual identity authentication (MIA) between the REQ and the REQ is performed.

In another implementation, the REQ may serve as a verified party, and the AAC may serve as a corresponding verifying party. The AAC is used to verify legality of identity of the REQ, thereby achieving REQ Authentication with the Unauthenticated AAC (RADA).

In yet another implementation, the AAC may serve as a verified party, and the REQ may serve as a corresponding verifying party. The REQ is used to verify legality of identity of the AAC, thereby achieving AAC Authentication with the Unauthenticated REQ (AAUR).

An identity authentication method provided in an embodiment of the present disclosure will be described below with reference to FIG. 1. Referring to FIG. 1, the method includes the following operations.

At S101, a REQ sends a first identity ciphertext message REQInit to an AAC.

REQInit includes a first identity information ciphertext. The first identity information ciphertext is generated by the REQ by using a message encryption key to encrypt information including an identifier $ID_{REQ}$ of the REQ. Exemplarily, the REQ uses the message encryption key and a symmetric encryption algorithm to encrypt the information including ID REQ to generate the first identity information ciphertext $EncData_{REQ}$. The message encryption key may be acquired by means of negotiation between the REQ and the AAC, or may be pre-shared between the REQ and the AAC. A manner in which the REQ and the AAC negotiate the message encryption key will be described in subsequent embodiments.

At S102, the AAC decrypts the first identity information ciphertext using the message encryption key to obtain the identifier of the REQ, determines a pre-shared key with the REQ based on the identifier of the REQ, and calculates an identity authentication key based on information including the pre-shared key and a first key. The first identity information ciphertext is acquired by the REQ by using the message encryption key and the symmetric encryption algorithm to encrypt the information including $ID_{REQ}$, so that after receiving REQInit sent by the REQ, the AAC may use the message encryption key pre-shared or negotiated between the AAC and the REQ and the symmetric encryption algorithm to decrypt the first identity information ciphertext $EncData_{REQ}$ in REQInit to obtain the identifier $ID_{REQ}$ of the REQ.

After decrypting $EncData_{REQ}$ to obtain $ID_{REQ}$, the AAC determines a pre-shared key PSK with the REQ based on $ID_{REQ}$. Then, the AAC uses PSK in combination with the first key K1 and other information (other information used by the AAC and the REQ is the same, and is optional, such as a particular string, etc.) and a key derivation algorithm to calculate the identity authentication key IAK.

It should be noted that the first key K1 is preconfigured or negotiated by the REQ and the AAC in advance. A recommended implementation manner in which the REQ and the AAC negotiate the first key K1 will be described in subsequent embodiments.

At S103, the AAC sends a second identity ciphertext message AACAuth to the REQ.

AACAuth includes a second identity information ciphertext and a second key exchange parameter $KeyInfo_{AAC\_second}$ of the AAC. The second identity information ciphertext is generated by the AAC by using the message encryption key to encrypt information including an identifier $ID_{AAC}$ of the AAC. Exemplarily, the AAC uses the message encryption key and the symmetric encryption algorithm to encrypt the information including $ID_{AAC}$ to generate the second identity information ciphertext $EncData_{AAC}$.

$KeyInfo_{AAC\_second}$ is generated by the AAC by using the identity authentication key IAK to encrypt information including a second temporary public key generated by the AAC. Simply, $KeyInfo_{AAC\_second}$ is a result of an XOR operation performed on a hash value of IAK and the information including the second temporary public key generated by the AAC. Alternatively, $KeyInfo_{AAC\_second}$ is a result of an XOR operation performed on an extended identity authentication key EIAK and the information including the second temporary public key generated by the AAC. EIAK is calculated by the AAC based on IAK and other information (other information used by the AAC and the REQ is the same, and is optional, such as a particular string, etc.) and by using a key derivation algorithm.

At S104, the REQ decrypts the second identity information ciphertext using the message encryption key to obtain the identifier of the AAC, determines a pre-shared key with the AAC based on the identifier of the AAC, and calculates an identity authentication key based on information including the pre-shared key and the first key.

The second identity information ciphertext is acquired by the AAC by using the message encryption key and the symmetric encryption algorithm to encrypt the information including $ID_{AAC}$, so that after receiving AACAuth sent by the AAC, the REQ may use the message encryption key pre-shared or negotiated between the REQ and the AAC and the symmetric encryption algorithm to decrypt the second identity information ciphertext $EncData_{AAC}$ in AACAuth to obtain the identifier $ID_{AAC}$ of the AAC.

After decrypting $EncData_{AAC}$ to obtain $ID_{AAC}$, the REQ determines a pre-shared key PSK with the AAC according to $ID_{AAC}$. Then, the REQ uses PSK in combination with the first key K1 and other information (other information used by the REQ and the AAC is the same, and is optional, such as a particular string, etc.) and the key derivation algorithm to calculate the identity authentication key IAK.

At S105, the REQ sends a first authentication message REQAuth to the AAC.

REQAuth includes a second key exchange parameter $KeyInfo_{REQ\_second}$ of the REQ. $KeyInfo_{REQ\_second}$ is generated by the REQ by using the identity authentication key IAK to encrypt information including a second temporary public key generated by the REQ. Simply, $KeyInfo_{REQ\_second}$ is a result of an XOR operation performed on a hash value of IAK and the information including the second temporary public key generated by the REQ. Alternatively, $KeyInfo_{REQ\_second}$ is a result of an XOR operation performed on an extended identity authentication key EIAK and the information including the second temporary public key generated by the REQ. EIAK is calculated by the REQ based on IAK and other information (other information used by the AAC and the REQ is the same, and is optional, such as a particular string, etc.) and by using the key derivation algorithm.

At S106, when the REQ is used as a verified party, the REQAuth further includes a first identity authentication code; after receiving the REQAuth, the AAC verifies the first identity authentication code by using the identity authentication key and first specified data, and determines an identity authentication result of the REQ according to a verification result.

The first identity authentication code is generated by the REQ by using the identity authentication key IAK to perform calculation on the first specified data. The first specified data includes $ID_{REQ}$ and a second key K2. The second key K2 is generated by the REQ by performing key exchange calculation on a second temporary private key corresponding to $KeyInfo_{REQ\_second}$ (i.e., a second temporary private key corresponding to the second temporary public key of the REQ) and a second temporary public key recovered from $KeyInfo_{AAC\_second}$. Exemplarily, the REQ performs the key exchange calculation on the second temporary private key corresponding to $KeyInfo_{REQ\_second}$ and the second temporary public key recovered from $KeyInfo_{AAC\_second}$ to generate the second key K2, and uses the identity authentication key IAK and an integrity check algorithm to perform calculation on information including $ID_{REQ}$ and K2 to generate the first identity authentication code $MIC_{REQ}$.

After receiving REQAuth, the AAC performs key exchange calculation on a second temporary private key corresponding to $KeyInfo_{AAC\_second}$ (i.e., a second temporary private key corresponding to the second temporary public key of the AAC) and a second temporary public key recovered from $KeyInfo_{REQ\_second}$ to generate a second key K2, verifies the first identity authentication code MIC REQ in REQAuth using information including the identity authentication key IAK calculated in S102, $ID_{REQ}$ acquired by means of decryption in S102, and the second key K2, and determines the identity authentication result of the REQ according to a verification result. Exemplarily, if verification is successful, the AAC determines that the identity authentication result of the REQ is that the REQ is legal, or if the verification is not successful, the AAC may perform processing in the following manner according to a local policy: discarding REQAuth, or determining that the identity authentication result of the REQ is that the REQ is not legal, or the like.

At S107, when the AAC is used as a verified party, the AAC sends a second authentication message AACResp to the REQ.

The AACResp includes a second identity authentication code. The second identity authentication code is generated by the AAC by using the identity authentication key IAK to perform calculation on second specified data. The second specified data includes $ID_{AAC}$ and the second key K2. The second key K2 is generated by performing key exchange calculation on the second temporary private key corresponding to $KeyInfo_{AAC\_second}$ and the second temporary public key recovered from $KeyInfo_{REQ\_second}$. Exemplarily, the AAC performs the key exchange calculation on the second temporary private key corresponding to $KeyInfo_{AAC\_second}$ and the second temporary public key recovered from $KeyInfo_{REQ\_second}$ to generate the second key K2, and uses the identity authentication key IAK calculated in S102 and a message integrity check algorithm to perform calculation on information including $ID_{AAC}$ and K2 to generate the second identity authentication code $MIC_{AAC}$.

At S108, the REQ receives the AACResp, verifies the second identity authentication code using the identity authentication key and second specified data, and determines an identity authentication result of the AAC according to a verification result.

After receiving the AACResp, the REQ performs the key exchange calculation on the second temporary private key corresponding to $KeyInfo_{REQ\_second}$ and the second temporary public key recovered from $KeyInfo_{AAC\_second}$ to generate the second key K2, verifies the second identity authentication code $MIC_{AAC}$ in the AACResp using information including the identity authentication key IAK calculated in S104, $ID_{AAC}$ acquired by means of decryption in S104, and the second key K2, and determines the identity authentication result of the AAC according to a verification result. Exemplarily, if verification is successful, the REQ determines that the identity authentication result of the AAC is that the AAC is legal, or if the verification is not successful, the REQ may perform processing in the following manner according to a local policy: discarding the AACResp, or determining that the identity authentication result of the AAC is that the AAC is not legal, or the like.

It should be understood that after S101 to S105 are performed: if the REQ and the AAC need to perform mutual identity authentication, S106, S107, and S108 need to be further performed; if only the AAC needs to perform unilateral identity authentication on the REQ, S106 is further performed, but S107 and S108 do not need to be performed; if only the REQ needs to perform unilateral identity authentication on the AAC, S106 does not need to be performed, and S107 and S108 need to be further performed.

Optionally, in an application scenario in which the mutual identity authentication is performed between the REQ and the AAC, that is, to use the REQ as a verified party and the AAC as a corresponding verifying party, and to use the AAC as a verified party and the REQ as a corresponding verifying party, if the REQ and AAC mutually verify that the identity of each other is legal, the REQ and the AAC may also update the pre-shared key PSK so as to use the same in a next identity authentication.

Exemplarily, the REQ may combine the second key K2 calculated thereby and the identity authentication key IAK calculated in S104, and use the key derivation algorithm to calculate a pre-shared key PSK used in the next identity authentication. Similarly, the AAC may combine the second key K2 calculated thereby and the identity authentication key IAK calculated in S102, and use the key derivation algorithm to calculate a pre-shared key PSK used in the next identity authentication.

Optionally, no matter in a scenario in which the mutual identity authentication is performed between the REQ and the AAC, or in a scenario in which unilateral identity authentication is performed by the AAC on the REQ, or in a scenario in which unilateral identity authentication is performed by the REQ on the AAC, when the verifying party verifies that the identity of the verified party is legal, the REQ and the AAC may further calculate a session key for ensuring that secure communication is performed between the REQ and the AAC.

Exemplarily, when the REQ calculates the session key, the REQ may use the second key K2 calculated thereby in combination with the identifier $ID_{REQ}$ of the REQ, the identifier $ID_{AAC}$ of the AAC, and other information (other information used by the REQ and the AAC is the same, and is optional, such as a particular string, etc.) and the key derivation algorithm to calculate the session key for performing secure communication with the AAC. The session key may include at least one of a data encryption key or a data integrity check key.

Similarly, when the AAC calculates the session key, the AAC may use the second key K2 calculated thereby in combination with the identifier $ID_{REQ}$ of the REQ, the identifier $ID_{AAC}$ of the AAC, and other information (other information used by the AAC and the REQ is the same, and is optional, such as a particular string, etc.) and the key derivation algorithm to calculate the session key for performing secure communication with the REQ. The session key may include at least one of a data encryption key or a data integrity check key.

The REQ may use the key derivation algorithm to calculate a string of key data in the above manner. The key data may be used as at least one of the data encryption key or the data integrity check key. Alternatively, some of the key data is used as the data encryption key, and the rest is used as the data integrity check key. The AAC may use the key derivation algorithm to calculate a string of key data in the above manner. The key data may be used as at least one of the data encryption key or the data integrity check key. Alternatively, some of the key data is used as the data encryption key, and the rest is used as the data integrity check key.

It can be seen from the above technical solution that when a requesting device and an authentication access controller perform identity authentication based on a pre-shared key authentication mechanism, identity information of the requesting device and the authentication access controller is transmitted in the form of a ciphertext during message transmission, so as to ensure that when a verifying party performs identity authentication based on the pre-shared key authentication mechanism, identity information of an opposite party can be acquired by decrypting an identity information ciphertext of the opposite party, so that real identity authentication is performed on a verified party. The identity information transmitted between the requesting device and the authentication access controller is present in the form of a ciphertext, so that the identity information of the verified party is prevented from being directly exposed during transmission, thereby ensuring that an attacker could not acquire private or sensitive information. Mutual or unilateral identity authentication is performed between an authentication access controller and a requesting device by using a pre-shared key, while confidentiality of identity related information of entities is ensured, thereby laying the foundation for ensuring that a user accessing a network is legal and/or a network to be accessed by a user is legal.

In the above embodiment, the message encryption key is negotiated by the REQ and the AAC. A method used by the REQ and the AAC to negotiate the message encryption key will be described below with reference to FIG. 2. The method includes the following operations.

At S201, the AAC sends a key negotiation request message AACInit to the REQ.

The AACInit includes a first key exchange parameter $KeyInfo_{AAC}$ of the AAC. $KeyInfo_{AAC}$ includes a first temporary public key generated by the AAC. Key exchange refers to a key exchange algorithm such as Diffie-Hellman (DH), etc. The AACInit may further include a first nonce $Nonce_{AAC}$ generated by the AAC.

The AACInit may further include Security capabilities$_{AAC}$. Security capabilities AA c represents security capability parameter information supported by the AAC, and includes at least one of the following: an identity authentication suite (the identity authentication suite includes one or more identity authentication methods); one or more symmetric encryption algorithms; one or more integrity check algorithms; one or more hash algorithms; one or more key exchange algorithms; or one or more key derivation algorithms etc., supported by the AAC, so that the REQ selects and uses a particular security policy. Therefore, the REQ may select, according to Security capabilities$_{AAC}$, the particular security policy Security capabilities REQ to be used by the REQ. Security capabilities REQ represents at least one of an identity authentication method, a symmetric encryption algorithm, an integrity check algorithm, a hash algorithm, a key exchange algorithm, or a key derivation algorithm etc., determined and used by the REQ.

At S202, the REQ performs key exchange calculation on a first temporary private key corresponding to a first key exchange parameter KeyInfo$_{REQ}$ of the REQ and a first temporary public key included in the KeyInfo$_{AAC}$ to generate a first key, and calculates a message encryption key based on information including the first key and by using the key derivation algorithm.

KeyInfo$_{REQ}$ includes a first temporary public key generated by the REQ. The first temporary private key corresponding to KeyInfo$_{REQ}$ is a first temporary private key corresponding to the first temporary public key of the REQ.

If the AACInit of S201 further includes Nonce$_{AAC}$ generated by the AAC, the REQ may calculate the message encryption key based on information including the first temporary private key corresponding to KeyInfo$_{REQ}$, the first temporary public key included in KeyInfo$_{AAC}$, Nonce$_{AAC}$, and a second nonce Nonce$_{REQ}$ generated by the REQ and by using a negotiated or preconfigured key derivation algorithm. The negotiated key derivation algorithm may be a key derivation algorithm selected and used by the REQ according to the Security capabilities$_{AAC}$ sent by the AAC. Exemplarily, the REQ performs the key exchange calculation on the first temporary private key corresponding to KeyInfo$_{REQ}$ and the first temporary public key included in KeyInfo$_{AAC}$ to obtain the first key K1, and then calculates the message encryption key according to K1, Nonce$_{AAC}$, Nonce$_{REQ}$, and other information (other information used by the REQ and the AAC is the same, and is optional, such as a particular string, etc.) and by using the key derivation algorithm.

At S203, the REQ sends a first identity ciphertext message REQInit to the AAC.

REQInit includes the first key exchange parameter KeyInfo$_{REQ}$ of the REQ, so that the AAC calculates the message encryption key based on information including the first temporary private key corresponding to KeyInfo$_{AAC}$ and the first temporary public key included in KeyInfo$_{REQ}$. The first temporary private key corresponding to KeyInfo$_{AAC}$ is the first temporary private key corresponding to the first temporary public key of the AAC.

If AACInit further includes Security capabilities$_{AAC}$, REQInit further includes Security capabilities REQ.

REQInit may further include Nonce$_{REQ}$ generated by the REQ, so that the AAC calculates the message encryption key based on information including the first temporary private key corresponding to KeyInfo$_{AAC}$, the first temporary public key included in KeyInfo$_{REQ}$, Nonce$_{AAC}$, and Nonce REQ.

REQInit may further include Nonce$_{AAC}$, so that before calculating the message encryption key, the AAC may first verify consistency between Nonce$_{AAC}$ in REQInit and Nonce$_{AAC}$ generated by the AAC, and if Nonce$_{AAC}$ in REQInit is consistent with Nonce$_{AAC}$ generated by the AAC, the AAC calculates the message encryption key.

At S204, the AAC performs key exchange calculation on a first temporary private key corresponding to the KeyInfo$_{AAC}$ and a first temporary public key included in the KeyInfo REQ to generate the first key, and calculates a message encryption key by using the key derivation algorithm based on information including the first key.

If REQInit further includes Nonce$_{REQ}$, the AAC may calculate the message encryption key based on information including the first temporary private key corresponding to KeyInfo$_{AAC}$, the first temporary public key included in KeyInfo$_{REQ}$, Nonce$_{AAC}$, and Nonce$_{REQ}$ and by using the negotiated or preconfigured key derivation algorithm. The negotiated key derivation algorithm may be a key derivation algorithm selected and used by the AAC according to the Security capabilities REQ sent by the REQ. Exemplarily, the AAC performs key exchange calculation on the first temporary private key corresponding to KeyInfo$_{AAC}$ and the first temporary public key included in KeyInfo$_{REQ}$ to generate the first key K1, and then calculates the message encryption key based on information including K1, Nonce$_{AAC}$, Nonce$_{REQ}$, and other information (other information used by the AAC and the REQ is the same, and is optional, such as a particular string, etc.) and by using the key derivation algorithm.

Figure 2:
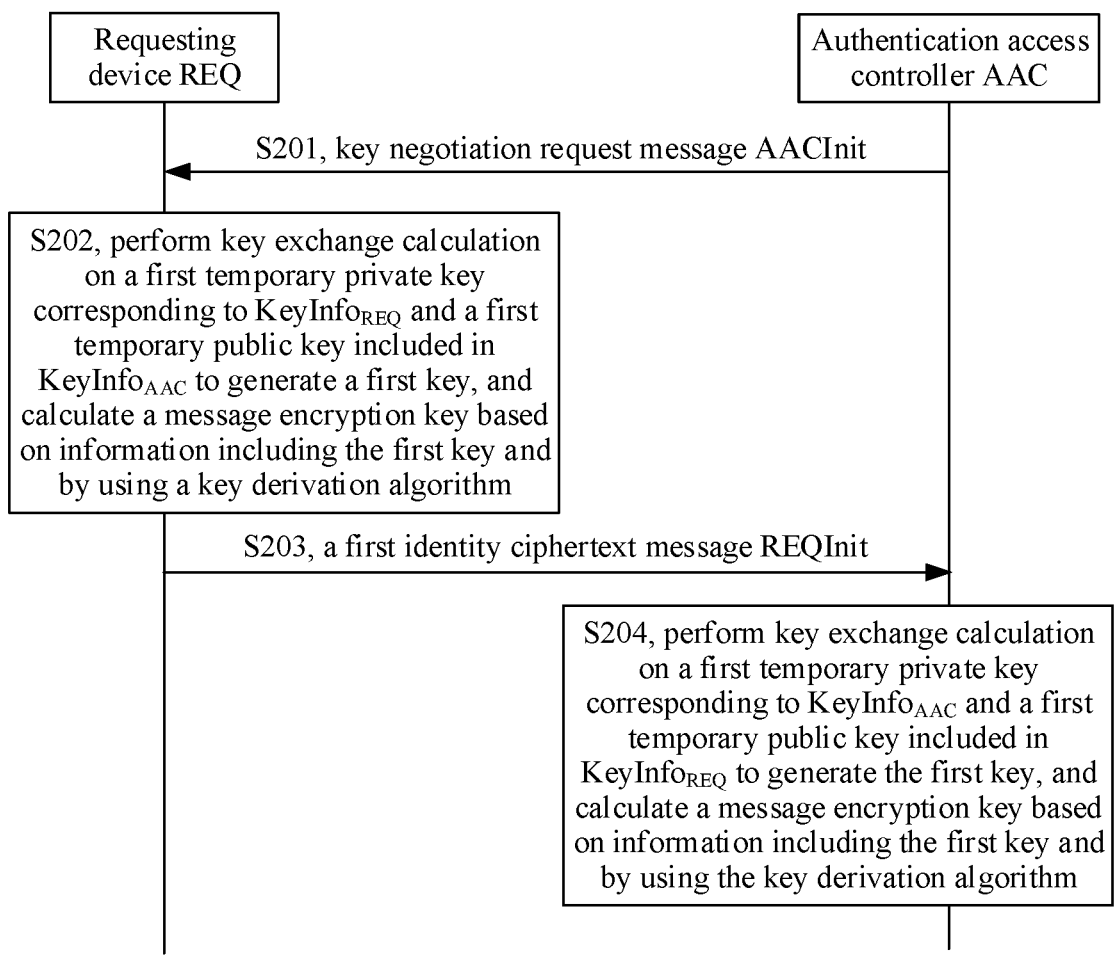
FIG. 2 is a schematic diagram of a method used by a requesting device (REQ) and an authentication access controller (AAC) to negotiate a message encryption key according to an embodiment of the present disclosure.

It should be noted that in the embodiment in FIG. 2, the REQ and the AAC may further calculate a message integrity check key. The implementation manner in which the REQ and the AAC each generates the message integrity check key is the same as the implementation manner in which the REQ and the AAC each generates the message encryption key illustrated in the embodiment of FIG. 2. For example, the AAC may use the key derivation algorithm to derive a string of key data as in the embodiment in FIG. 2. The key data can be used as at least one of the message encryption key or the message integrity check key. Alternatively, a part of the key data is used as the message encryption key, and the rest part of the key data is used as the message integrity check key. The AAC may also use the key derivation algorithm to derive two identical or different strings of key data separately as in the embodiment in FIG. 2. One string of key data is used as the message encryption key, and the other string of key data is used as the message integrity check key. The REQ may use the key derivation algorithm to derive a string of key data as in the embodiment in FIG. 2. The key data can be used as at least one of the message encryption key or the message integrity check key. Alternatively, a part of the key data is used as the message encryption key, and the rest part of the key data is used as the message integrity check key. The REQ may also use the key derivation algorithm to derive two identical or different strings of key data separately as in the embodiment in FIG. 2. One string of key data is used as the message encryption key, and the other string of key data is used as the message integrity check key.

Referring to FIG. 1, to ensure the reliability of an authentication result, the AAC may generate a message integrity check code. For example, AACAuth of S103 may further include a first message integrity check code MacTag$_{AAC}$ generated by the AAC by using a message integrity check key generated by the AAC itself to perform calculation on other fields other than MacTag$_{AAC}$ in the AACAuth, so that after receiving the AACAuth, the REQ first uses a message integrity check key generated by the REQ itself to verify MacTag$_{AAC}$, and performs a subsequent operation after verification is successful, or discards the AACAuth if verification is not successful. During verification of MacTag$_{AAC}$, the REQ needs to use the message integrity check key to perform calculation locally on another field other than $MacTag_{AAC}$ in the AACAuth to generate $MacTag_{AAC}$, and determines, by means of comparison, whether locally calculated $MacTag_{AAC}$ is consistent with $MacTag_{AAC}$ in received AACAuth, and if so, verification is successful, or if not, the REQ discards AACAuth.

Correspondingly, the REQ may also generate a message integrity check code. For example, REQAuth of S105 may further include a second message integrity check code $MacTag_{REQ}$ generated by the REQ by using a message integrity check key generated thereby to perform calculation on other fields other than $MacTag_{REQ}$ in the REQAuth, so that after receiving the REQAuth, the AAC first uses a message integrity check key generated thereby to verify $MacTag_{REQ}$, and performs a subsequent operation after verification is successful, or discards REQAuth if verification is not successful. During verification of $MacTag_{REQ}$, the AAC needs to use the message integrity check key to perform calculation locally on other fields other than $MacTag_{REQ}$ in the REQAuth to generate $MacTag_{REQ}$, and determines, by means of comparison, whether locally calculated $MacTag_{REQ}$ is consistent with $MacTag_{REQ}$ in received REQAuth, and if so, verification is successful, or if not, the AAC discards the REQAuth.

In some embodiments, if AACAuth of S103 further includes at least one of $Nonce_{AAC}$ or $Nonce_{REQ}$, after receiving the AACAuth, the REQ may first perform at least one of the following: verifying consistency between $Nonce_{AAC}$ in the AACAuth and $Nonce_{AAC}$ in AACInit sent by the AAC to the REQ, or verifying consistency between $Nonce_{REQ}$ in the AACAuth and $Nonce_{REQ}$ generated by the REQ, and if verification is successful, the REQ continues to perform a subsequent operation, or if verification is not successful, the REQ discards AACAuth.

In some embodiments, if REQAuth of S105 further includes at least one of $Nonce_{AAC}$ or $Nonce_{REQ}$, after receiving the REQAuth, the AAC may first perform at least one of the following: verifying consistency between $Nonce_{AAC}$ in the REQAuth and $Nonce_{AAC}$ generated by the AAC, or verifying consistency between $Nonce_{REQ}$ in the REQAuth and $Nonce_{REQ}$ sent by the REQ to the AAC, and if verification is successful, the AAC continues to perform a subsequent operation, or if verification is not successful, the ACC discards the REQAuth.

In some embodiments, if AACResp of S107 further includes at least one of $Nonce_{AAC}$ or $Nonce_{REQ}$, after receiving the AACResp, the REQ may first perform at least one of the following: verifying consistency between $Nonce_{AAC}$ in the AACResp and $Nonce_{AAC}$ in AACInit sent by the AAC to the REQ, or verifying consistency between $Nonce_{REQ}$ in the AACResp and $Nonce_{REQ}$ generated by the REQ, and if verification is successful, the REQ continues to perform a subsequent operation, or if verification is not successful, the REQ discards the AACResp.

On the basis of the above embodiment, the identity authentication method provided in the embodiments of the present disclosure will be described below with reference to specific application scenarios for two cases, i.e., mutual identity authentication and unilateral identity authentication.

Figure 3:
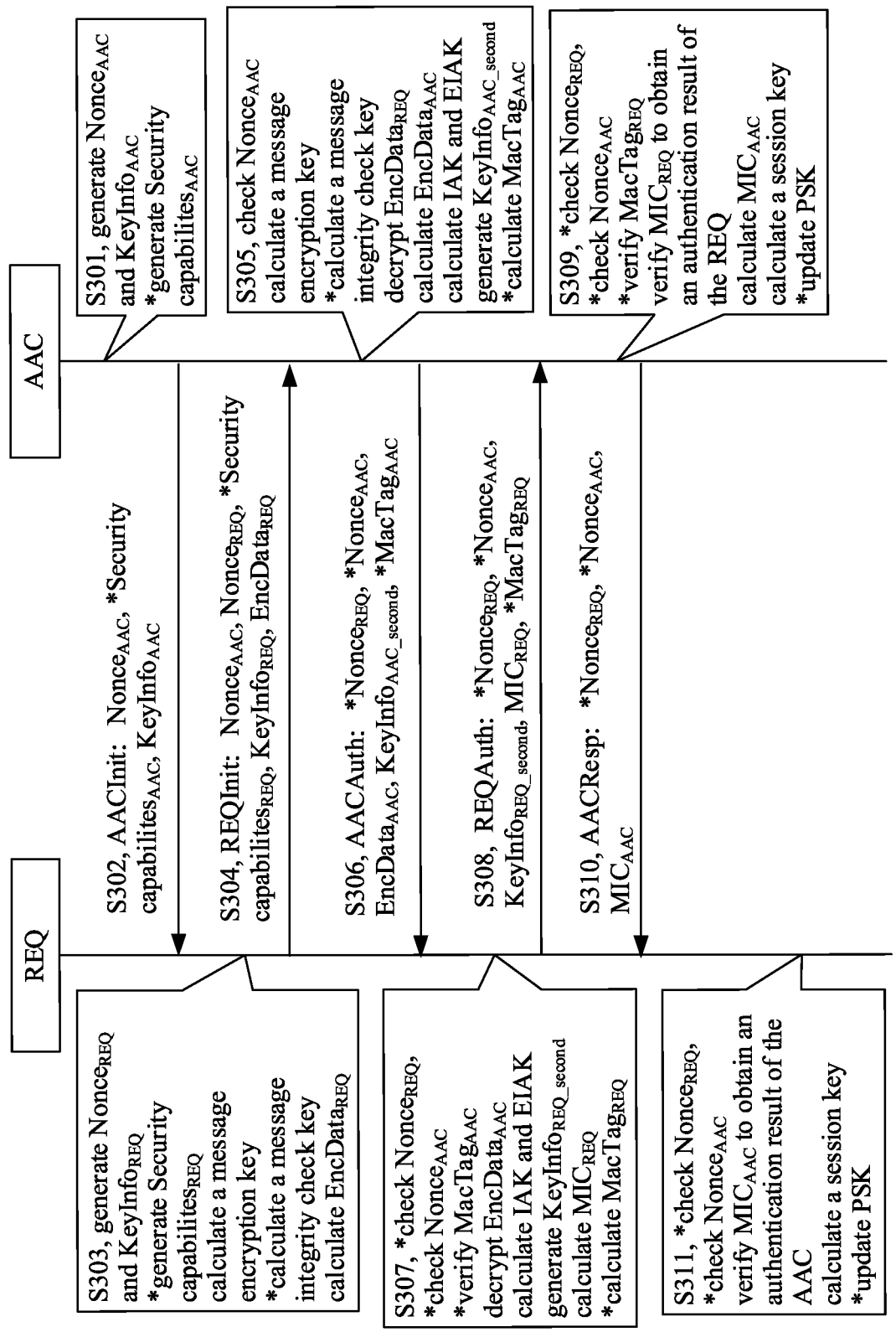
FIG. 3 is a schematic diagram of a mutual identity authentication method according to an embodiment of the present disclosure, where "*" represents an optional field or an optional operation.

Referring to FIG. 3, a mutual identity authentication method is provided in an embodiment of the present disclosure. The method includes the following operations.

At S301, the AAC generates $Nonce_{AAC}$ and $KeyInfo_{AAC}$, and generates Security $capabilities_{AAC}$ as needed.

At S302, the AAC sends a key negotiation request message AACInit to the REQ.

The AACInit includes the $Nonce_{AAC}$, the Security $capabilities_{AAC}$, and the $KeyInfo_{AAC}$. The Security $capabilities_{AAC}$ is an optionally field, which represents security capability parameter information supported by the AAC, and includes at least one of the following: an identity authentication suite; one or more symmetric encryption algorithms; one or more integrity check algorithms; one or more hash algorithms; one or more key exchange algorithms; or one or more key derivation algorithms etc., supported by the AAC.

At S303, the REQ generates $Nonce_{REQ}$ and $KeyInfo_{REQ}$ and generates Security capabilities RE Q as required, performs key exchange calculation on a first temporary private key corresponding to the $KeyInfo_{REQ}$ and a first temporary public key included in the $KeyInfo_{AAC}$ to generate a first key K1, calculates a message encryption key and a message integrity check key according to K1 in combination with $Nonce_{AAC}$, $Nonce_{REQ}$, and other information (other information used by the REQ and the AAC is the same, and is optional, such as a particular string, etc.) and by using a key derivation algorithm, and calculates a first identity information ciphertext $EncData_{REQ}$ using the message encryption key and a symmetric encryption algorithm.

The operation of generating, by the REQ, the message integrity check key is an optional operation.

At S304, the REQ sends a first identity ciphertext message REQInit to the AAC.

The REQInit includes the $Nonce_{AAC}$, the $Nonce_{REQ}$, the Security $capabilities_{REQ}$, the $KeyInfo_{REQ}$, and the $EncData_{REQ}$. The $Nonce_{AAC}$ shall be equal to a value of a corresponding field $Nonce_{AAC}$ in the AACInit. The Security capabilities REQ is an optional field. When the Security $capabilities_{AAC}$ is present in the AACInit, the Security $capabilities_{REQ}$ is present in the REQInit. The Security $capabilities_{REQ}$ represents selection of a particular security policy performed by the REQ according to the Security $capabilities_{AAC}$, and includes at least one of the following: an identity authentication method; a symmetric encryption algorithm; an integrity check algorithm; a hash algorithm; a key exchange algorithm; or a key derivation algorithm, etc., determined and used by the REQ. To-be-encrypted data of $EncData_{REQ}$ includes $ID_{REQ}$. In the embodiments of the present disclosure, an object to be encrypted is referred to as to-be-encrypted data.

At S305, after receiving the REQInit, the AAC performs the following operations (if not specified otherwise or if not due to a logical relationship, actions numbered (1), (2), . . . below do not have a necessary order due to the numbers, the same for the full text).

(1) Checking whether the $Nonce_{AAC}$ in the REQInit is the same as the $Nonce_{AAC}$ generated by the AAC; and if they are different, discarding the REQInit.

(2) Performing key exchange calculation on the first temporary private key corresponding to the $KeyInfo_{AAC}$ and the first temporary public key included in the $KeyInfo_{REQ}$ to generate a first key K1, and calculating a message encryption key and a message integrity check key based on the K1 in combination with the $Nonce_{AAC}$, the $Nonce_{REQ}$, and other information (other information used by the AAC and the REQ is the same, and is optional, such as a particular string, etc.) and by using a key derivation algorithm, where the operation of generating, by the AAC, the message integrity check key is an optional operation.

(3) Decrypting the $EncData_{REQ}$ using the message encryption key to obtain $ID_{REQ}$.

(4) Calculating a second identity information ciphertext EncData$_{AAC}$ using the message encryption key and the symmetric encryption algorithm.

(5) Determining a pre-shared key PSK with the REQ based on the ID$_{REQ}$ acquired by means of decryption, and calculating an identity authentication key IAK using the PSK in combination with the K1 and other information (other information used by the AAC and the REQ is the same, and is optional, such as a particular string, etc.) and the key derivation algorithm.

(6) Calculating EIAK based on IAK and other information (other information used by the AAC and the REQ is the same, and is optional, such as a particular string, etc.) using the key derivation algorithm.

(7) Generating a second key exchange parameter KeyInfo$_{AAC\_second}$; and (8) Calculating a first message integrity check code MacTag$_{AAC}$ as required.

At S306, the AAC sends a second identity ciphertext message AACAuth to the REQ.

The AACAuth includes the Nonce$_{REQ}$, the Nonce$_{AAC}$, the EncData$_{AAC}$, the KeyInfo$_{AAC\_second}$, and the MacTag$_{AAC}$, where the Nonce$_{REQ}$, the Nonce$_{AAC}$, and the MacTag$_{AAC}$ are optional fields. The Nonce$_{REQ}$ and Nonce$_{AAC}$ shall be respectively equal to Nonce$_{REQ}$ in the REQInit and Nonce$_{AAC}$ generated by the AAC. To-be-encrypted data of the EncData$_{AAC}$ includes ID$_{AAC}$. KeyInfo$_{AAC\_second}$ is a result of an XOR operation performed on information including a second temporary public key generated by the AAC and EIAK. A calculation process of MacTag$_{AAC}$ includes: using the message integrity check key and the integrity check algorithm to perform calculation on other fields other than MacTag$_{AAC}$ in AACAuth to generate MacTag$_{AAC}$.

At S307, the REQ receives the AACAuth, and then performs the following operations.

(1) If the AACAuth carries at least one of Nonce$_{REQ}$ or Nonce$_{AAC}$, performing at least one of the following: checking whether the Nonce$_{REQ}$ is the same as Nonce$_{REQ}$ generated by the REQ, or checking whether the Nonce$_{AAC}$ is the same as Nonce$_{AAC}$ in AACInit.

(2) If the AACAuth carries the MacTag$_{AAC}$, verifying the MacTag$_{AAC}$.

A verification process including: using the message integrity check key and the integrity check algorithm to perform calculation locally on other fields, except MacTag$_{AAC}$, in the AACAuth to generate MacTag$_{AAC}$ (the calculation manner is the same as a manner in which the AAC calculates MacTag$_{AAC}$), and comparing the generated MacTag$_{AAC}$ with MacTag$_{AAC}$ in the received AACAuth.

(3) If any operation in the above checking or verification is not successful, discarding the AACAuth immediately; or if both the above checking and verification are successful, decrypting the EncData$_{AAC}$ using the message encryption key and the symmetric encryption algorithm to obtain ID$_{AAC}$.

(4) Determining a pre-shared key PSK with the AAC according to the ID$_{AAC}$ acquired by means of decryption, and calculating an identity authentication key IAK using PSK in combination with K1 calculated in S303 and other information (other information used by the REQ and the AAC is the same, and is optional, such as a particular string, etc.) and the key derivation algorithm.

(5) Calculating EIAK by using the key derivation algorithm and based on IAK and other information (other information used by the AAC and the REQ is the same, and is optional, such as a particular string, etc.).

(6) Generating a second key exchange parameter KeyInfo$_{REQ\_second}$.

(7) Calculating a first identity authentication code MIC$_{REQ}$; and (8) Calculating a second message integrity check code MacTag$_{REQ}$ as required.

At S308, the REQ sends a first authentication message REQAuth to the AAC.

The REQAuth includes Nonce$_{REQ}$, Nonce$_{AAC}$, KeyInfo$_{REQ\_second}$, MIC$_{REQ}$, and MacTag$_{REQ}$. The Nonce$_{REQ}$, Nonce$_{AAC}$, and MacTag$_{REQ}$ are optional fields. The Nonce$_{REQ}$ and Nonce$_{AAC}$ shall be respectively equal to Nonce$_{REQ}$ generated by the REQ and Nonce$_{AAC}$ in AACInit. The MIC$_{REQ}$ is acquired by the REQ by using IAK calculated in S307 and the integrity check algorithm to perform calculation on first specified data including ID$_{REQ}$, Nonce$_{REQ}$, and a second key K2 generated by the REQ. K2 is acquired by the REQ by performing key exchange calculation on a second temporary private key corresponding to KeyInfo$_{REQ\_second}$ and a second temporary public key recovered from KeyInfo$_{AAC\_second}$. KeyInfo$_{REQ\_second}$ is a result of an XOR operation performed on information including a second temporary public key generated by the REQ and EIAK. A calculation process of MacTag$_{REQ}$ includes: using the message integrity check key and the integrity check algorithm to perform calculation on other fields, except MacTag$_{REQ}$, in REQAuth to generate MacTag$_{REQ}$.

At S309, the AAC receives the REQAuth, and then performs the following operations.

(1) If the REQAuth includes at least one of Nonce$_{REQ}$ or Nonce$_{AAC}$, performing at least one of the following: checking whether the Nonce$_{REQ}$ is the same as Nonce$_{REQ}$ in the REQInit, or checking whether the Nonce$_{AAC}$ is the same as Nonce$_{AAC}$ generated by the AAC.

(2) If the MacTag$_{REQ}$ is present in the REQAuth, verifying the MacTag$_{REQ}$.

A verification process including: using the message integrity check key and the integrity check algorithm to perform calculation locally on other fields, except MacTag$_{REQ}$, in the REQAuth to generate MacTag$_{REQ}$ (the calculation manner is the same as a manner in which the REQ calculates MacTag$_{REQ}$), and comparing the locally calculated MacTag$_{REQ}$ with MacTag$_{REQ}$ in the received REQAuth.

(3) After both the above checking and verification are successful, verifying MIC$_{REQ}$, or if any operation in the above checking or verification is not successful, discarding the REQAuth immediately.

For example, the AAC uses IAK calculated in S305 and the integrity check algorithm to perform calculation locally on the first specified data to obtain MIC$_{REQ}$, the first specified data including ID$_{REQ}$, Nonce$_{REQ}$, a second key K2 generated by the AAC, and K2 being acquired by the AAC by performing key exchange calculation on a second temporary private key corresponding to KeyInfo$_{AAC\_second}$ and a second temporary public key recovered from KeyInfo$_{REQ\_second}$. The AAC determines, by means of comparison, whether the locally calculated MIC$_{REQ}$ is consistent with MIC$_{REQ}$ in the received REQAuth, and if so, determines that the REQ is legal, or if not, performs the following operation according to a local policy: determining that the REQ is not legal or ending the current authentication process.

(4) Calculating a second identity authentication code MIC$_{AAC}$; and (5) Calculating a session key, and updating PSK as required.

Exemplarily, the AAC uses the key derivation algorithm to perform calculation on the second key K2 calculated by the ACC itself in combination with $Nonce_{AAC}$, $Nonce_{REQ}$, $ID_{AAC}$, $ID_{REQ}$, and other information (other information used by the AAC and the REQ is the same, and is optional, such as a particular string, etc.) to generate the session key (including at least one of a data encryption key or a data integrity check key) for subsequent secure communication with the REQ. Optionally, the AAC may use K2 calculated thereby in combination with IAK and the key derivation algorithm to calculate PSK used in a next identity authentication.

At S310, the AAC sends a second authentication message AACResp to the REQ.

The AACResp includes $Nonce_{REQ}$, $Nonce_{AAC}$, and $MIC_{AAC}$. $Nonce_{REQ}$ and $Nonce_{AAC}$ are optional fields, and shall be respectively equal to $Nonce_{REQ}$ in the REQInit and $Nonce_{AAC}$ generated by the AAC. $MIC_{AAC}$ is acquired by the AAC by using IAK calculated in S305 and the integrity check algorithm to perform calculation on second specified data. The second specified data includes $ID_{AAC}$, $Nonce_{AAC}$, and the second key K2 generated by the AAC.

At S311, the REQ receives the AACResp, and then performs the following operations.

(1) If at least one of $Nonce_{REQ}$ or $Nonce_{AAC}$ is present in the AACResp, performing at least one of the following: checking whether the $Nonce_{REQ}$ is the same as $Nonce_{REQ}$ generated by the REQ; or checking whether the $Nonce_{AAC}$ is the same as $Nonce_{AAC}$ in the AACInit; and if not, discarding the AACResp.

(2) Verifying $MIC_{AAC}$. For example, the REQ uses IAK calculated in S307 and the integrity check algorithm to perform calculation locally on second specified data to obtain $MIC_{AAC}$, the second specified data including $ID_{AAC}$, $Nonce_{AAC}$, and the second key K2 generated by the REQ. The REQ determines, by means of comparison, whether the locally calculated $MIC_{AAC}$ is consistent with $MIC_{AAC}$ in the received AACResp, and if so, determines that the AAC is legal, or if not, performs the following operation according to a local policy: determining that the AAC is not legal or ending the current authentication process.

(3) Calculating a session key, and updating PSK as required.

Exemplarily, the REQ uses the key derivation algorithm to perform calculation on the second key K2 calculated by the REQ itself in combination with $Nonce_{AAC}$, $Nonce_{REQ}$, $ID_{AAC}$, $ID_{REQ}$, and other information (other information used by the REQ and the AAC is the same, and is optional, such as a particular string, etc.) to generate the session key (including a data encryption key and/or a data integrity check key) for subsequent secure communication with the AAC. Optionally, the REQ may use K2 calculated by itself in combination with IAK and the key derivation algorithm to calculate PSK used in a next identity authentication.

Therefore, the identity authentication on the REQ and the identity authentication on the AAC are respectively performed in S309 and S311. That is, mutual identity authentication of the REQ and the AAC is performed.

Figure 4:
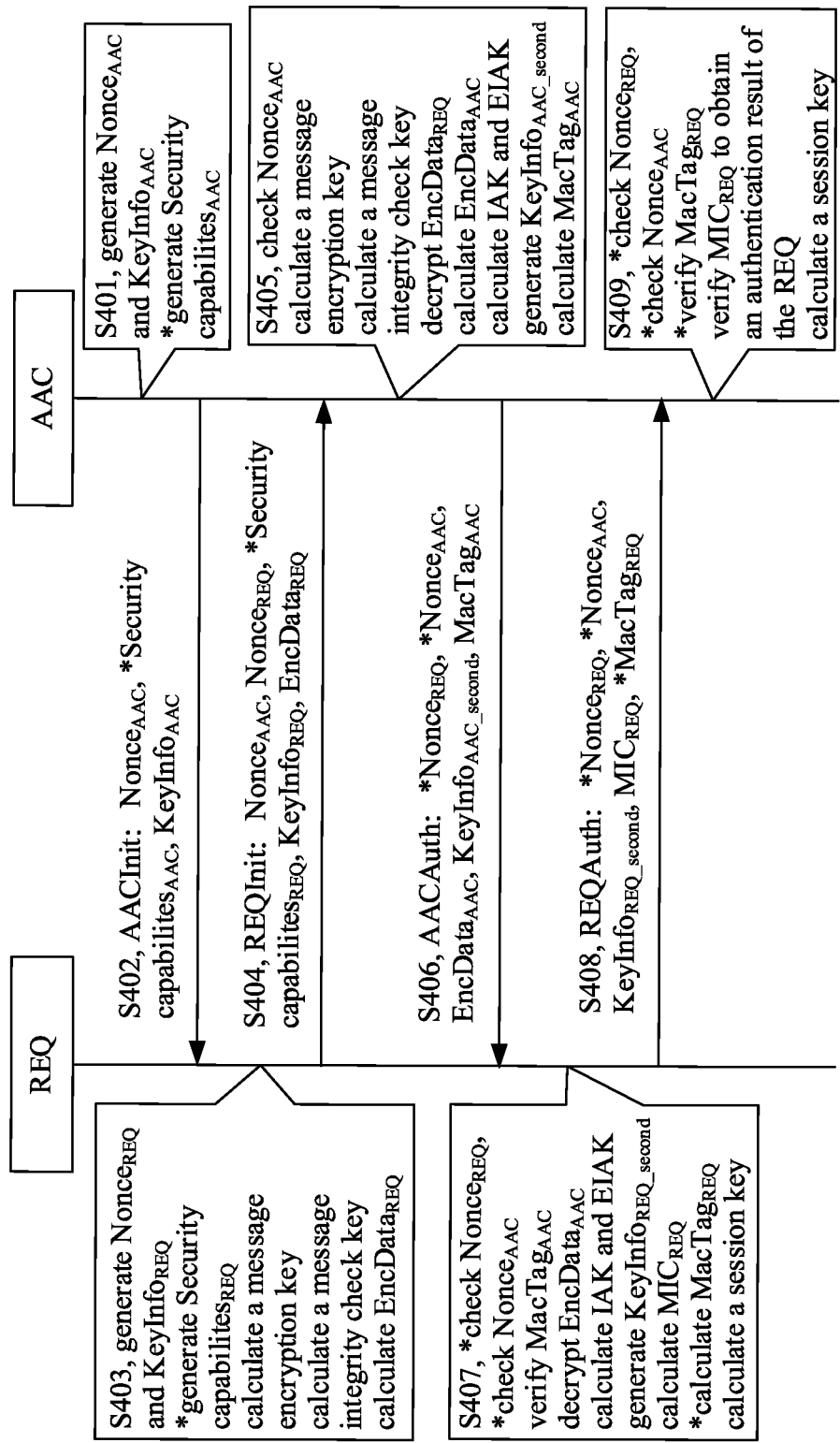
FIG. 4 is a schematic diagram of an identity authentication method for performing unilateral authentication on an REQ according to an embodiment of the present disclosure, where "*" represents an optional field or an optional operation.

Referring to FIG. 4, an identity authentication method for performing unilateral authentication on a REQ is provided in an embodiment of the present disclosure. The method includes the following operations.

At S401, the AAC generates $Nonce_{AAC}$ and $KeyInfo_{AAC}$, and generates Security $capabilities_{AAC}$ as needed.

At S402, the AAC sends a key negotiation request message AACInit to the REQ.

The $Nonce_{AAC}$, the Security $capabilities_{AAC}$, and the $KeyInfo_{AAC}$ are included in the AACInit. The Security $capabilities_{AAC}$ is an optional field.

At S403, the REQ generates $Nonce_{REQ}$ and $KeyInfo_{REQ}$ and generates Security capabilities REQ as required, performs key exchange calculation on a first temporary private key corresponding to the $KeyInfo_{REQ}$ and a first temporary public key included in the $KeyInfo_{AAC}$ to generate a first key K1, calculates a message encryption key and a message integrity check key based on K1 in combination with the $Nonce_{AAC}$, the $Nonce_{REQ}$, and other information (other information used by the REQ and the AAC is the same, and is optional, such as a particular string, etc.) and by using a key derivation algorithm, and calculates a first identity information ciphertext $EncData_{REQ}$ by using the message encryption key and a symmetric encryption algorithm.

The operation of generating, by the REQ, the message integrity check key may be performed subsequently when the message integrity check key needs to be used.

At S404, the REQ sends a first identity ciphertext message REQInit to the AAC.

$Nonce_{AAC}$, $Nonce_{REQ}$, Security $capabilities_{REQ}$, $KeyInfo_{REQ}$, and $EncData_{REQ}$ are included in the REQInit. $Nonce_{AAC}$ shall be equal to a value of a corresponding field in the AACInit. Security capabilities REQ is an optional field. When Security $capabilities_{AAC}$ is present in the AACInit, Security $capabilities_{REQ}$ is present in the REQInit. To-be-encrypted data of the $EncData_{REQ}$ includes $ID_{REQ}$.

At S405, the AAC receives the REQInit, and then performs the following operations, including:

(1) Checking whether the $Nonce_{AAC}$ in the REQInit is the same as the Nonce AA c generated by the AAC; and if they are different, discarding the REQInit;

(2) Performing key exchange calculation on the first temporary private key corresponding to the $KeyInfo_{AAC}$ and the first temporary public key included in the $KeyInfo_{REQ}$ to generate a first key K1, and then calculating a message encryption key and a message integrity check key based on K1 in combination with $Nonce_{AAC}$, $Nonce_{REQ}$, and other information (other information used by the AAC and the REQ is the same, and is optional, such as a particular string, etc.) and by using a key derivation algorithm. The operation of generating, by the AAC, the message integrity check key may be performed subsequently when the message integrity check key needs to be used.

(3) Decrypting the $EncData_{REQ}$ using the message encryption key to obtain $ID_{REQ}$;

(4) Calculating a second identity information ciphertext $EncData_{AAC}$ using the message encryption key and the symmetric encryption algorithm;

(5) Determining a pre-shared key PSK with the REQ according to the $ID_{REQ}$ acquired by means of decryption, and calculating an identity authentication key IAK using PSK in combination with K1 and other information (other information used by the AAC and the REQ is the same, and is optional, such as a particular string, etc.) and the key derivation algorithm;

(6) Calculating EIAK based on IAK and other information (other information used by the AAC and the REQ is the same, and is optional, such as a particular string, etc.) by using the key derivation algorithm;

(7) Generating a second key exchange parameter $KeyInfo_{AAC\_second}$; and (8) Calculating a first message integrity check code $MacTag_{AAC}$.

At S406, the AAC sends a second identity ciphertext message AACAuth to the REQ.

The AACAuth includes the $Nonce_{REQ}$, the $Nonce_{AAC}$, the $EncData_{AAC}$, the $KeyInfo_{AAC\_second}$, and the $MacTag_{AAC}$. The $Nonce_{REQ}$ and the $Nonce_{AAC}$ are optional fields. The $Nonce_{REQ}$ and the $Nonce_{AAC}$ shall be respectively equal to the $Nonce_{REQ}$ in the REQInit and the $Nonce_{AAC}$ generated by the AAC. To-be-encrypted data of the $EncData_{AAC}$ includes $ID_{AAC}$. The $KeyInfo_{AAC\_second}$ is a result of an XOR operation performed on information including a second temporary public key generated by the AAC and EIAK. A calculation process of the $MacTag_{AAC}$ includes: using the message integrity check key and the integrity check algorithm to perform calculation on other fields, except the $MacTag_{AAC}$, in the AACAuth to generate the $MacTag_{AAC}$.

At S407, the REQ receives the AACAuth, and then performs the following operations, including:

(1) If the AACAuth carries at least one of $Nonce_{REQ}$ or $Nonce_{AAC}$, performing at least one of the following: checking whether the $Nonce_{REQ}$ is the same as $Nonce_{REQ}$ generated by the REQ; or checking whether the $Nonce_{AAC}$ is the same as $Nonce_{AAC}$ in AACInit.

(2) Verifying $MacTag_{AAC}$, a verification process including: using the message integrity check key and the integrity check algorithm to perform calculation locally on other fields, except $MacTag_{AAC}$, in the AACAuth to generate $MacTag_{AAC}$, and comparing the generated $MacTag_{AAC}$ with MacTagAAC in the received AACAuth.

(3) If any operation in the above checking or verification is not successful, discarding the AACAuth immediately, or if both the above checking and verification are successful, decrypting the $EncData_{AAC}$ using the message encryption key and the symmetric encryption algorithm to obtain $ID_{AAC}$.

(4) Determining a pre-shared key PSK with the AAC according to the $ID_{AAC}$ acquired by means of decryption, and calculating an identity authentication key IAK by using PSK in combination with K1 calculated in S403 and other information (other information used by the REQ and the AAC is the same, and is optional, such as a particular string, etc.) and the key derivation algorithm.

(5) Calculating EIAK using the key derivation algorithm and based on IAK and other information (other information used by the AAC and the REQ is the same, and is optional, such as a particular string, etc.).

(6) Generating a second key exchange parameter $KeyInfo_{REQ\_second}$;

(7) Calculating a first identity authentication code $MIC_{REQ}$;

(8) Calculating a second message integrity check code $MacTag_{REQ}$ as required; and (9) Calculating a session key.

Exemplarily, the REQ uses the key derivation algorithm to perform calculation on the second key K2 calculated by the REQ itself in combination with $Nonce_{AAC}$, $Nonce_{REQ}$, $ID_{AAC}$, $ID_{REQ}$, and other information (other information used by the REQ and the AAC is the same, and is optional, such as a particular string, etc.) to generate the session key (including at least one of a data encryption key or a data integrity check key) for subsequent secure communication with the AAC. K2 is acquired by the REQ by performing key exchange calculation on a second temporary private key corresponding to $KeyInfo_{REQ\_second}$ and a second temporary public key recovered from $KeyInfo_{AAC\_second}$.

At S408, the REQ sends a first authentication message REQAuth to the AAC.

The REQAuth includes $Nonce_{REQ}$, $Nonce_{AAC}$, $KeyInfo_{REQ\_second}$, $MIC_{REQ}$, and $MacTag_{REQ}$. $Nonce_{REQ}$, $Nonce_{AAC}$, and $MacTag_{REQ}$ are optional fields. The $Nonce_{REQ}$ and $Nonce_{AAC}$ shall be respectively equal to $Nonce_{REQ}$ generated by the REQ and $Nonce_{AAC}$ in the AACInit. MIC REQ is acquired by the REQ by using IAK calculated in S407 and the integrity check algorithm to perform calculation on first specified data, the first specified data including $ID_{REQ}$, $Nonce_{REQ}$, $ID_{AAC}$, $Nonce_{AAC}$, and the second key K2 generated by the REQ. $KeyInfo_{REQ\_second}$ is a result of an XOR operation performed on information including a second temporary public key generated by the REQ and EIAK. The calculation process of the $MacTag_{REQ}$ is: using a message integrity check key and an integrity check algorithm to perform a calculation on fields other than the $MacTag_{REQ}$ in the REQAuth to generate the $MacTag_{REQ}$.

At S409, the AAC receives the REQAuth, and then performs the following operations, including:

(1) If at least one of $Nonce_{REQ}$ or $Nonce_{AAC}$ is present in the REQAuth, performing at least one of the following: checking whether the $Nonce_{REQ}$ is the same as $Nonce_{REQ}$ in the REQInit; or checking whether the $Nonce_{AAC}$ is the same as $Nonce_{AAC}$ generated by the AAC.

(2) If the $MacTag_{REQ}$ is present in the REQAuth, verifying the $MacTag_{REQ}$.

A verification process including: using the message integrity check key and the integrity check algorithm to perform calculation locally on other fields, except $MacTag_{REQ}$, in the REQAuth to generate $MacTag_{REQ}$, and comparing the calculated $MacTag_{REQ}$ with $MacTag_{REQ}$ in the received REQAuth.

(3) If any operation in the above checking or verification is not successful, discarding the REQAuth immediately, or if both the above checking and verification are successful, verifying the $MIC_{REQ}$.

For example, the AAC uses IAK calculated in S405 and the integrity check algorithm to perform calculation locally on the first specified data to obtain $MIC_{REQ}$, the first specified data including $ID_{REQ}$, $Nonce_{REQ}$, $ID_{AAC}$, $Nonce_{AAC}$, and a second key K2 generated by the AAC, and K2 being acquired by the AAC by performing key exchange calculation on a second temporary private key corresponding to $KeyInfo_{AAC\_second}$ and a second temporary public key recovered from $KeyInfo_{REQ\_second}$. The AAC determines, by means of comparison, whether the locally calculated $MIC_{REQ}$ is consistent with MIC REQ in the received REQAuth, and if so, determines that the REQ is legal, or if not, performs the following operation according to a local policy: determining that the REQ is not legal or ending the current authentication process; and (4) Calculating a session key.

Exemplarily, the AAC uses the key derivation algorithm to perform calculation on the second key K2 calculated by the ACC itself in combination with $Nonce_{AAC}$, $Nonce_{REQ}$, $ID_{AAC}$, $ID_{REQ}$, and other information (other information used by the AAC and the REQ is the same, and is optional, such as a particular string, etc.) to generate the session key (including at least one of a data encryption key or a data integrity check key) for subsequent secure communication with the REQ.

Therefore, the identity authentication on the REQ is performed in S409. That is, unilateral identity authentication performed by the AAC on the REQ is performed.

Figure 5:
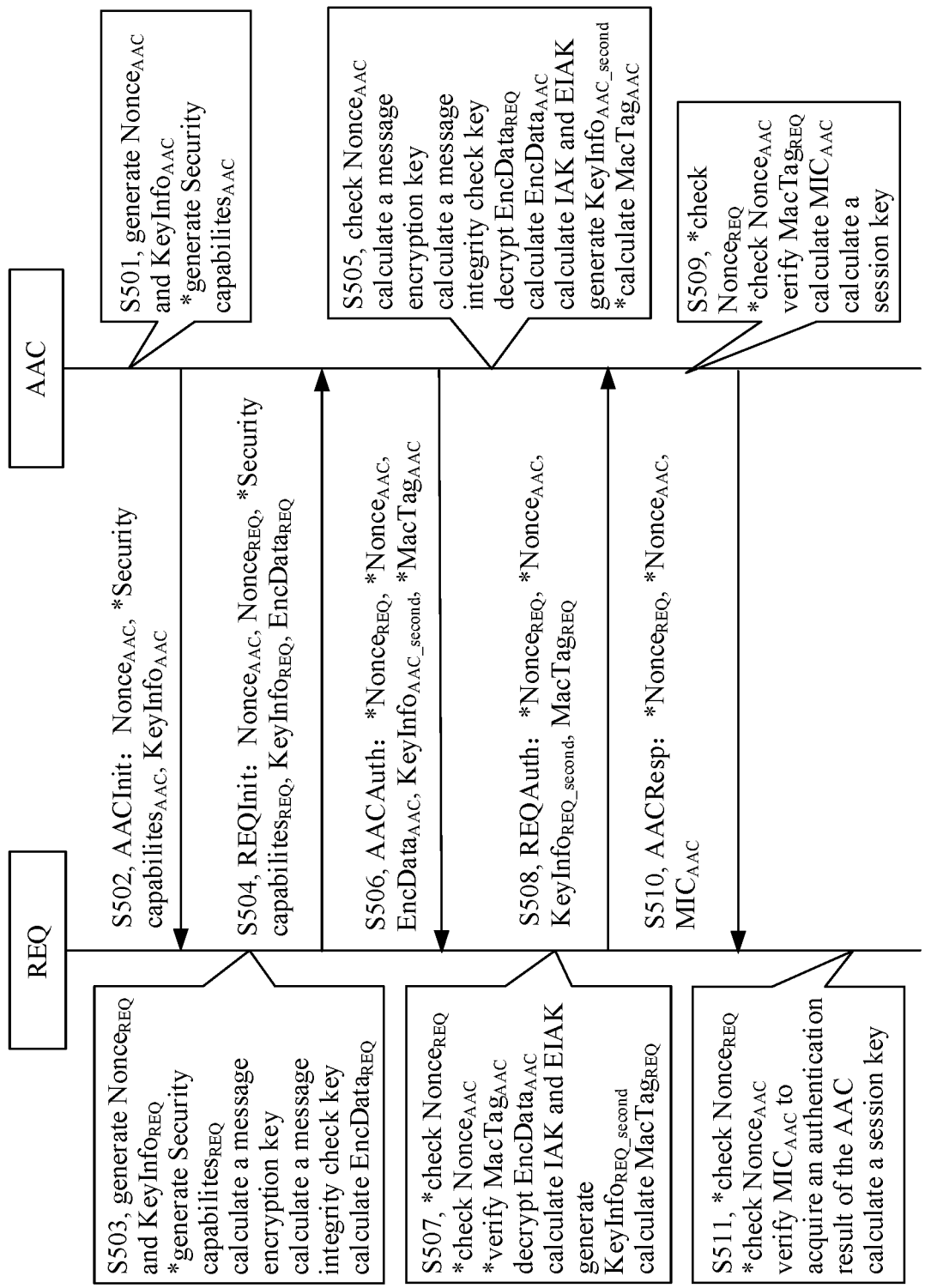
FIG. 5 is a schematic diagram of an identity authentication method for performing unilateral authentication on an AAC according to an embodiment of the present disclosure, where "*" represents an optional field or an optional operation.

Referring to FIG. 5, an identity authentication method for performing unilateral authentication on an AAC is provided in an embodiment of the present disclosure. The method includes the following operations.

At S501, the AAC generates $Nonce_{AAC}$ and $KeyInfo_{AAC}$, and generates Security $capabilities_{AAC}$ as needed.

At S502, the AAC sends a key negotiation request message AACInit to the REQ.

The $Nonce_{AAC}$, the Security $capabilities_{AAC}$, and the $KeyInfo_{AAC}$ are included in the AACInit. The Security $capabilities_{AAC}$ is an optional field.

At S503, the REQ generates $Nonce_{REQ}$ and $KeyInfo_{REQ}$, generates Security capabilities REQ as required, performs key exchange calculation on a first temporary private key corresponding to $KeyInfo_{REQ}$ and a first temporary public key included in $KeyInfo_{AAC}$ to generate a first key K1, calculates a message encryption key and a message integrity check key based on K1 in combination with $Nonce_{AAC}$, $Nonce_{REQ}$, and other information (other information used by the REQ and the AAC is the same, and is optional, such as a particular string, etc.) and by using a key derivation algorithm, and calculates a first identity information ciphertext $EncData_{REQ}$ using the message encryption key and a symmetric encryption algorithm.

The operation of generating, by the REQ, the message integrity check key may be performed subsequently when the message integrity check key needs to be used.

At S504, the REQ sends a first identity ciphertext message REQInit to the AAC.

$Nonce_{AAC}$, $Nonce_{REQ}$, Security $capabilities_{REQ}$, $KeyInfo_{REQ}$, and $EncData_{REQ}$ are included in the REQInit. $Nonce_{AAC}$ shall be equal to a value of a corresponding field in the AACInit. Security capabilities REQ is an optional field. When Security $capabilities_{AAC}$ is present in the AACInit, Security $capabilities_{REQ}$ is present in the REQInit. To-be-encrypted data of $EncData_{REQ}$ includes $ID_{REQ}$.

At S505, the AAC receives the REQInit, and then performs the following operations, including:

(1) Checking whether the $Nonce_{AAC}$ in the REQInit is the same as the $Nonce_{AAC}$ generated by the AAC; and if they are different, discarding the REQInit.

(2) Performing key exchange calculation on the first temporary private key corresponding to $KeyInfo_{AAC}$ and the first temporary public key included in $KeyInfo_{REQ}$ to generate a first key K1, and calculating a message encryption key and a message integrity check key according to K1 in combination with $Nonce_{AAC}$, $Nonce_{REQ}$, and other information (other information used by the AAC and the REQ is the same, and is optional, such as a particular string, etc.) and by using a key derivation algorithm. The operation of generating, by the AAC, the message integrity check key may be performed subsequently when the message integrity check key needs to be used.

(3) Decrypting the $EncData_{REQ}$ using the message encryption key to obtain $ID_{REQ}$.

(4) Calculating a second identity information ciphertext $EncData_{AAC}$ using the message encryption key and the symmetric encryption algorithm.

(5) Determining a pre-shared key PSK with the REQ according to the $ID_{REQ}$ acquired by means of decryption, and using PSK in combination with K1 and other information (other information used by the AAC and the REQ is the same, and is optional, such as a particular string, etc.) and the key derivation algorithm to calculate an identity authentication key IAK.

(6) Calculating EIAK based on the IAK and other information (other information used by the AAC and the REQ is the same, and is optional, such as a particular string, etc.) and using the key derivation algorithm.

(7) Generating a second key exchange parameter $KeyInfo_{AAC\_second}$; and (8) Calculating a first message integrity check code $MacTag_{AAC}$ as required.

At S506, the AAC sends a second identity ciphertext message AACAuth to the REQ.

The AACAuth includes $Nonce_{REQ}$, $Nonce_{AAC}$, $EncData_{AAC}$, $KeyInfo_{AAC\_second}$, and $MacTag_{AAC}$. $Nonce_{REQ}$, $Nonce_{AAC}$, and $MacTag_{AAC}$ are optional fields. $Nonce_{REQ}$ and $Nonce_{AAC}$ shall be respectively equal to $Nonce_{REQ}$ in the REQInit and $Nonce_{AAC}$ generated by the AAC. To-be-encrypted data of $EncData_{AAC}$ includes $ID_{AAC}$. $KeyInfo_{AAC\_second}$ is a result of an XOR operation performed on information including a second temporary public key generated by the AAC and the EIAK. A calculation process of $MacTag_{AAC}$ includes: using the message integrity check key and the integrity check algorithm to perform calculation on other fields, except $MacTag_{AAC}$, in the AACAuth to generate $MacTag_{AAC}$.

At S507, the REQ receives the AACAuth, and then performs the following operations, including:

(1) If the AACAuth carries at least one of $Nonce_{REQ}$ or $Nonce_{AAC}$, performing at least one of the following: checking whether the $Nonce_{REQ}$ is the same as $Nonce_{REQ}$ generated by the REQ; or checking whether the $Nonce_{AAC}$ is the same as $Nonce_{AAC}$ in the AACInit.

(2) If the $MacTag_{AAC}$ is carried in the AACAuth, verifying the $MacTag_{AAC}$. A verification process including: using the message integrity check key and the integrity check algorithm to perform calculation locally on other fields, except $MacTag_{AAC}$, in the AACAuth to generate $MacTag_{AAC}$, and comparing the generated $MacTag_{AAC}$ with MacTagAAC in the received AACAuth.

(3) If any operation in the above checking or verification is not successful, discarding the AACAuth immediately, or if both the above checking and verification are successful, decrypting $EncData_{AAC}$ using the message encryption key and the symmetric encryption algorithm to obtain $ID_{AAC}$.

(4) Determining a pre-shared key PSK with the AAC according to the $ID_{AAC}$ acquired by means of decryption, and using the PSK in combination with the K1 calculated in S503 and other information (other information used by the REQ and the AAC is the same, and is optional, such as a particular string, etc.) and the key derivation algorithm to calculate an identity authentication key IAK.

(5) Calculating EIAK based on the IAK and other information (other information used by the AAC and the REQ is the same, and is optional, such as a particular string, etc.) and using the key derivation algorithm.

(6) Generating a second key exchange parameter $KeyInfo_{REQ\_second}$; and (7) Calculating a second message integrity check code $MacTag_{REQ}$.

At S508, the REQ sends a first authentication message REQAuth to the AAC.

The REQAuth includes $Nonce_{REQ}$, $Nonce_{AAC}$, $KeyInfo_{REQ\_second}$, and $MacTag_{REQ}$. The $Nonce_{REQ}$ and the $Nonce_{AAC}$ are optional fields. The $Nonce_{REQ}$ and the $Nonce_{AAC}$ shall be respectively equal to $Nonce_{REQ}$ generated by the REQ and $Nonce_{AAC}$ in the AACInit. The $KeyInfo_{REQ\_second}$ is a result of an XOR operation performed on information including a second temporary public key generated by the REQ and the EIAK. The calculation process of the Mac- $Tag_{REQ}$ is: using a message integrity check key to perform a calculation on fields other than the $MacTag_{REQ}$ in the REQAuth by adopting an integrity check algorithm to generate the $MacTag_{REQ}$.

At S509, the AAC receives the REQAuth, and then performs the following operations, including:

(1) If at least one of $Nonce_{REQ}$ or $Nonce_{AAC}$ is present in the REQAuth, performing at least one of the following: checking whether the $Nonce_{REQ}$ is the same as $Nonce_{REQ}$ in the REQInit; or checking whether the $Nonce_{AAC}$ is the same as $Nonce_{AAC}$ generated by the AAC.

(2) Verifying the $MacTag_{REQ}$, a verification process including: using the message integrity check key and the integrity check algorithm to perform calculation locally on other fields, except $MacTag_{REQ}$, in the REQAuth to generate $MacTag_{REQ}$, and comparing the calculated $MacTag_{REQ}$ with $MacTag_{REQ}$ in the received REQAuth.

(3) After the above checking and verification are successful, calculating a second identity authentication code $MIC_{AAC}$, or if any operation in the above checking or verification is not successful, discarding the REQAuth immediately; and (4) Calculating a session key.

Exemplarily, the AAC uses the key derivation algorithm to perform calculation on the second key K2 calculated by the AAC itself in combination with $Nonce_{AAC}$, $Nonce_{REQ}$, $ID_{AAC}$, $ID_{REQ}$, and other information (other information used by the AAC and the REQ is the same, and is optional, such as a particular string, etc.) to generate the session key (including at least one of a data encryption key or a data integrity check key) for subsequent secure communication with the REQ. K2 is acquired by the AAC by performing key exchange calculation on a second temporary private key corresponding to $KeyInfo_{AAC\_second}$ and a second temporary public key recovered from $KeyInfo_{REQ\_second}$.

At S510, the AAC sends a second authentication message AACResp to the REQ.

The AACResp includes $Nonce_{REQ}$, $Nonce_{AAC}$, and $MIC_{AAC}$. The $Nonce_{REQ}$ and $Nonce_{AAC}$ are optional fields, and shall be respectively equal to $Nonce_{REQ}$ in the REQInit and $Nonce_{AAC}$ generated by the AAC. $MIC_{AAC}$ is acquired by the AAC by using IAK calculated in S505 and the integrity check algorithm to perform calculation on second specified data including $ID_{AAC}$, $Nonce_{AAC}$, $ID_{REQ}$, $Nonce_{REQ}$, and the second key K2 generated by the AAC.

At S511, the REQ receives the AACResp, and then performs the following operations:

(1) If at least one of $Nonce_{REQ}$ or $Nonce_{AAC}$ is present in the AACResp, performing at least one of the following: checking whether the $Nonce_{REQ}$ is the same as $Nonce_{REQ}$ generated by the REQ; or checking whether the $Nonce_{AAC}$ is the same as $Nonce_{AAC}$ in the AACInit; and if not, discarding the AACResp.

(2) Verifying $MIC_{AAC}$. For example, the REQ uses IAK calculated in S507 and the integrity check algorithm to perform calculation locally on the second specified data to obtain $MIC_{AAC}$, the second specified data including $ID_{AAC}$, $Nonce_{AAC}$, $ID_{REQ}$, $Nonce_{REQ}$, and a second key K2 generated by the REQ, and K2 being acquired by the REQ by performing key exchange calculation on a second temporary private key corresponding to $KeyInfo_{REQ\_second}$ and a second temporary public key recovered from $KeyInfo_{AAC\_second}$. The REQ determines, by means of comparison, whether the locally calculated $MIC_{AAC}$ is consistent with $MIC_{AAC}$ in the received AACResp, and if so, determines that the AAC is legal, or if not, performs the following operation according to a local policy: determining that the AAC is not legal or ending the current authentication process; and (3) Calculating a session key.

Exemplarily, the REQ uses the key derivation algorithm to perform calculation on the second key K2 calculated by the REQ itself in combination with $Nonce_{AAC}$, $Nonce_{REQ}$, $ID_{AAC}$, $ID_{REQ}$, and other information (other information used by the REQ and the AAC is the same, and is optional, such as a particular string, etc.) to generate the session key (including at least one of a data encryption key or a data integrity check key) for subsequent secure communication with the AAC.

Therefore, the identity authentication on the AAC is performed in S511. That is, unilateral identity authentication performed by the REQ on the AAC is performed.

In each of the above embodiments, each message may also carry a hash value $HASH_X$. The hash value $HASH_X$ is obtained by a sending entity X of the message by using a hash algorithm to perform a calculation on the latest preceding message received from a peer entity Y, and is used by the peer entity Y to verify whether the entity X has received the complete latest preceding message. If X represents a REQ, Y represents an AAC correspondingly. If X represents an AAC, Y represents a REQ correspondingly. HASH REQ represents a hash value calculated by the REQ for a received latest preceding message sent by the AAC. $HASH_{AAC}$ represents a hash value calculated by the AAC for a received latest preceding message sent by the REQ. If a message currently sent by the sending entity X is a first message for interaction between the entity X and the entity Y, it means that the entity X has not received a preceding message sent by the peer entity Y, then the message may not carry the $HASH_X$ or the $HASH_X$ in the message may be meaningless.

Correspondingly, after the peer entity Y receives the message sent by the entity X, when the message includes the $HASH_X$: if the entity Y has not sent any preceding message to the entity X before, the entity Y ignores the $HASH_X$; or if the entity Y has sent a preceding message to the entity X before, the entity Y uses a hash algorithm to locally calculate a hash value for a latest preceding message sent to the entity X previously, and compares the calculated hash value with the hash value $HASH_X$ carried in the received message, and if the two hash values are consistent with each other, performs subsequent operations, or if the two hash values are not consistent with each other, discards the received message or ends the current authentication process.

In the present disclosure, for the entity X, the preceding message sent by the peer entity Y to the entity X refers to a message sent by the peer entity Y to the entity X and received before the entity X sends a message M to the peer entity Y, and the latest preceding message sent by the peer entity Y to the entity X refers to a latest message sent by the peer entity Y to the entity X and received before the entity X sends the message M to the peer entity Y. If the message M sent by the entity X to its peer entity Y is a first message for interaction between the entity X and the entity Y, there is no preceding message sent by the peer entity Y to the entity X before the entity X sends the message M to its peer entity Y.

It should be noted that the optional fields and optional operations in the corresponding embodiments of FIG. 3, FIG. 4 and FIG. 5 described above are denoted by "*" in FIG. 3, FIG. 4 and FIG. 5 of the drawings, respectively. No limitation is set on the order of various contents included in the messages involved in all the above embodiments, and if not specified otherwise, no limitation is set on the order of operations performed by a message receiver on relevant messages upon receiving the messages or the order of processing performed on contents included in the messages.

Figure 6:
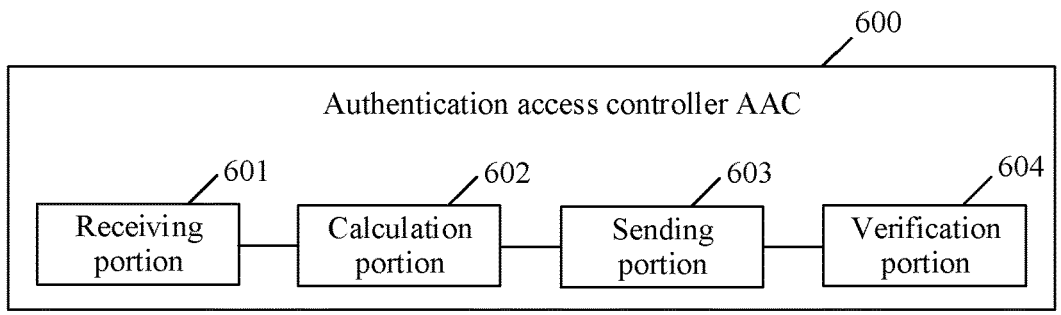
FIG. 6 is a structural block diagram of an authentication access controller (AAC) according to an embodiment of the present disclosure.

On the basis of the method embodiments corresponding to FIG. 1 to FIG. 5, an embodiment of the present disclosure also provides an authentication access controller. The authentication access controller may be used as not only a verified party but also a verifying party, and may also have functions of both a verified party and a verifying party. Referring to FIG. 6, an authentication access controller 600 includes a receiving portion 601, a calculation portion 602, and a sending portion 603.

The receiving portion 601 is configured to receive a first identity ciphertext message sent by a requesting device, where the first identity ciphertext message includes a first identity information ciphertext generated by using a message encryption key to encrypt information including an identifier of the requesting device.

The calculation portion 602 is configured to decrypt the first identity information ciphertext using the message encryption key to obtain the identifier of the requesting device, determine a pre-shared key with the requesting device based on the identifier of the requesting device, and calculate an identity authentication key based on information including the pre-shared key and a first key.

The sending portion 603 is configured to send a second identity ciphertext message to the requesting device, where the second identity ciphertext message includes a second identity information ciphertext and a second key exchange parameter of the authentication access controller, the second identity information ciphertext being generated by the authentication access controller by using the message encryption key to encrypt information including an identifier of the authentication access controller, and the second key exchange parameter of the authentication access controller being generated by using the identity authentication key to encrypt information including a second temporary public key generated by the authentication access controller.

The receiving portion 601 is further configured to receive a first authentication message sent by the requesting device, where the first authentication message includes a second key exchange parameter of the requesting device, the second key exchange parameter of the requesting device being generated by the requesting device by using the identity authentication key to encrypt information including a second temporary public key generated by the requesting device.

Where at least one of the following applies:

when the requesting device is used as a verified party, the first authentication message further includes a first identity authentication code generated by the requesting device by using the identity authentication key to encrypt first specified data including the identifier and a second key of the requesting device, and the second key being generated by the requesting device by performing key exchange calculation on a second temporary private key corresponding to the second temporary public key of the requesting device and the second temporary public key recovered from the second key exchange parameter of the authentication access controller, where the authentication access controller further includes: a verification portion 604, configured to verify the first identity authentication code in the first authentication message using the identity authentication key and the first specified data, and determine an identity authentication result of the requesting device according to a verification result; or when the authentication access controller is used as a verified party, the sending portion 603 is further configured to send a second authentication message to the requesting device, the second authentication message including a second identity authentication code generated by the authentication access controller by using the identity authentication key to perform calculation on second specified data including the identifier and a second key of the authentication access controller, the second key being generated by the authentication access controller by performing the key exchange calculation on a second temporary private key corresponding to the second temporary public key of the authentication access controller and the second temporary public key recovered from the second key exchange parameter of the requesting device.

Optionally, the sending portion 603 is further configured to send a key negotiation request message to the requesting device, where the key negotiation request message includes a first key exchange parameter generated by the authentication access controller, the first key exchange parameter of the authentication access controller including a first temporary public key generated by the authentication access controller, correspondingly, the first identity ciphertext message further includes a first key exchange parameter of the requesting device, the first key exchange parameter of the requesting device including a first temporary public key generated by the requesting device, and the calculation portion 602 is further configured to perform the key exchange calculation on a first temporary private key corresponding to the first temporary public key of the authentication access controller and the first temporary public key of the requesting device to obtain the first key.

Optionally, the calculation portion 602 is further configured to calculate the message encryption key based on calculation information including the first key and by using a key derivation algorithm.

Optionally, the key negotiation request message further includes a first nonce generated by the authentication access controller, and correspondingly the first identity ciphertext message further includes a second nonce generated by the requesting device, so that the calculation information used by the calculation portion 602 to calculate the message encryption key further includes the first nonce and the second nonce.

Optionally, the first identity ciphertext message further includes a first nonce, and before the calculation portion 602 calculates the message encryption key, the verification portion 604 is further configured to verify consistency between the first nonce in the first identity ciphertext message and the first nonce generated by the authentication access controller.

Optionally, the first authentication message further includes at least one of the first nonce or the second nonce, so that the verification portion 604 is further configured to perform at least one of the following: verifying consistency between the first nonce in the first authentication message and the first nonce generated by the authentication access controller, or verifying consistency between the second nonce in the first authentication message and the second nonce in the first identity ciphertext message, and if verification is successful, the authentication access controller acquires the second key exchange parameter of the requesting device.

Optionally, when the calculation portion 602 calculates the message encryption key by using the key derivation algorithm, a message integrity check key is further derived, and at least one of the following applies:

the second identity ciphertext message sent by the sending portion 603 further includes a first message integrity check code generated by the calculation portion 602 by using the message integrity check key and an integrity check algorithm to perform calculation on other fields, except the first message integrity check code, in the second identity ciphertext message; or the first authentication message received by the receiving portion 601 further includes a second message integrity check code, so that the verification portion 604 is further configured to use the message integrity check key to verify the second message integrity check code, and after verification is successful, the verification portion 604 verifies the first identity authentication code when the requesting device is a verified party.

Optionally, the calculation portion 602 is further configured to use a key derivation algorithm to calculate a session key based on information including the second key, the identifier of the requesting device, and the identifier of the identity authentication access controller.

Optionally, the requesting device is used as a verified party, and the authentication access controller is used as a corresponding verifying party; and the authentication access controller is used as a verified party, and the requesting device is used as a corresponding verifying party, where when the requesting device and the authentication access controller mutually verify that the identity of each other is legal, the calculation portion 602 is further configured to use the key derivation algorithm to calculate, based on information including the second key and the identity authentication key, a pre-shared key to be used in a next identity authentication.

Optionally, the message sent by the authentication access controller to the requesting device further include a hash value calculated by the authentication access controller on the received latest preceding message sent by the requesting device.

Figure 7:
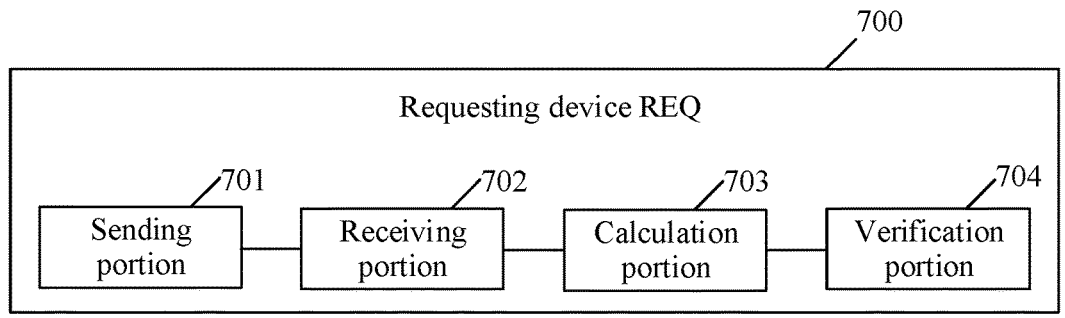
FIG. 7 is a structural diagram of a requesting device (REQ) according to an embodiment of the present disclosure.

An embodiment of the present disclosure also provides a requesting device. The requesting device may be used as not only a verified party but also a verifying party, and may also have functions of both a verified party and a verifying party. Referring to FIG. 7, a requesting device 700 includes: a sending portion 701, a receiving portion 702, and a calculation portion 703.

The sending portion 701 is configured to send a first identity ciphertext message to an authentication access controller, where the first identity ciphertext message includes a first identity information ciphertext generated by using a message encryption key to encrypt information including an identifier of the requesting device.

The receiving portion 702 is configured to receive a second identity ciphertext message sent by the authentication access controller, where the second identity ciphertext message includes a second identity information ciphertext and a second key exchange parameter of the authentication access controller, the second identity information ciphertext being generated by the authentication access controller by using the message encryption key to encrypt information including an identifier of the authentication access controller, and the second key exchange parameter of the authentication access controller being generated by using the identity authentication key to encrypt information including a second temporary public key generated by the authentication access controller.

The calculation portion 703 is configured to decrypt the second identity information ciphertext using the message encryption key to obtain the identifier of the authentication access controller, determine a pre-shared key with the authentication access controller based on the identifier of the authentication access controller, and calculate the identity authentication key based on information including the pre-shared key and a first key.

The sending portion 701 is further configured to send a first authentication message to the authentication access controller, where the first authentication message includes a second key exchange parameter of the requesting device, the second key exchange parameter of the requesting device being generated by the requesting device by using the identity authentication key to encrypt information including a second temporary public key generated by the requesting device.

Where at least one of the following applies:

when the requesting device is used as a verified party, the first authentication message further includes a first identity authentication code generated by the requesting device by using the identity authentication key to encrypt first specified data including the identifier and a second key of the requesting device, and the second key being generated by the requesting device by performing key exchange calculation on a second temporary private key corresponding to the second temporary public key of the requesting device and a second temporary public key recovered from the second key exchange parameter of the authentication access controller; or when the authentication access server is used as a verified party, the receiving portion 702 is further configured to receive a second authentication message sent by the authentication access controller, where the second authentication message includes a second identity authentication code generated by the authentication access controller by using the identity authentication key to encrypt second specified data including the identifier and a second key of the authentication access controller, the second key being generated by the authentication access controller by performing the key exchange calculation on a second temporary private key corresponding to the second temporary public key of the authentication access controller and the second temporary public key recovered from the second key exchange parameter of the requesting device; and the requesting device further includes: a verification portion 704, configured to verify the second identity authentication code in the second authentication message using the identity authentication key and the second specified data, and determine an identity authentication result of the authentication access controller according to a verification result.

The receiving portion 702 is further configured to receive a key negotiation request message sent by the authentication access controller, where the key negotiation request message includes a first key exchange parameter generated by the authentication access controller, the first key exchange parameter of the authentication access controller including a first temporary public key generated by the authentication access controller, the calculation portion 703 is further configured to perform the key exchange calculation on a first temporary private key corresponding to a first temporary public key of the requesting device and the first temporary public key of the authentication access controller to generate the first key, a first key exchange parameter of the requesting device including the first temporary public key generated by the requesting device, and the first identity ciphertext message sent by the sending portion 701 further includes the first key exchange parameter of the requesting device.

Optionally, the calculation portion 703 is further configured to calculate the message encryption key based on calculation information including the first key and by using a key derivation algorithm.

Optionally, the key negotiation request message further includes a first nonce generated by the authentication access controller, so that the calculation information used by the calculation portion 703 to calculate the message encryption key further includes the first nonce and a second nonce generated by the requesting device, and correspondingly, the first identity ciphertext message sent by the sending portion 701 further includes the second nonce.

Optionally, the first identity ciphertext message sent by the sending portion 701 further includes the first nonce.

Optionally, at least one of the following applies:
the second identity ciphertext message further includes at least one of the first nonce or the second nonce, so that the verification portion 704 is further configured to perform at least one of the following: verifying consistency between the first nonce in the second identity ciphertext message and the first nonce in the key negotiation request message, or verifying consistency between the second nonce in the second identity ciphertext message and the second nonce generated by the requesting device, and if verification is successful, the calculation portion 703 decrypts the second identity information ciphertext to acquire the identifier of the authentication access controller; or
the second authentication message further includes at least one of the first nonce or the second nonce, so that the verification portion 704 is further configured to perform at least one of the following: verifying consistency between the first nonce in the second authentication message and the first nonce in the key negotiation request message, or verifying consistency between the second nonce in the second authentication message and the second nonce generated by the requesting device, and if verification is successful, the verification portion 704 verifies the second identity authentication code.

Optionally, the key negotiation request message further includes security capability parameter information supported by the authentication access controller, and the requesting device further includes:
a determination portion, configured to determine, based on the security capability parameter information, a specific security policy used by the requesting device;
the first identity ciphertext message sent by the sending portion 701 further includes the particular security policy.

Optionally, when the calculation portion 703 calculates the message encryption key by using the key derivation algorithm, a message integrity check key is further derived, and
at least one of the following applies:
the second identity ciphertext message further includes a first message integrity check code, so that the verification portion 704 is further configured to use the message integrity check key to verify the first message integrity check code, and after verification is successful, the calculation portion 703 uses the message encryption key to decrypt the second identity information ciphertext to acquire the identifier of the authentication access controller; or
the first authentication message sent by the sending portion 701 further includes a second message integrity check code generated by the calculation portion 703 by using the message integrity check key and an integrity check algorithm to perform calculation on other fields, except the second message integrity check code, in the first authentication message.

Optionally, the calculation portion 703 is further configured to use a key derivation algorithm to calculate a session key based on information including the second key, the identifier of the requesting device, and the identifier of the authentication access controller.

Optionally, the requesting device is used as a verified party, and the authentication access controller is used as a corresponding verifying party; and the authentication access controller is used as a verified party, and the requesting device is used as a corresponding verifying party, where when the requesting device and the authentication access controller mutually verify that the identity of each other is legal, the calculation portion 703 is further configured to use the key derivation algorithm to calculate, based on information including the second key and the identity authentication key, a pre-shared key to be used in a next identity authentication.

Optionally, the message sent by the requesting device to the authentication access controller further include a hash value calculated by the requesting device on the received latest preceding message sent by the authentication access controller.

In the above embodiments of the present disclosure and other embodiments, the "portion" may be some circuits, some processors, some programs or software, or the like, or certainly, may be units, and may be modular or non-modular.

Figure 8:
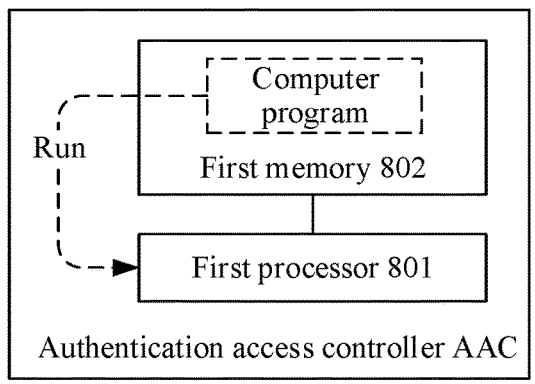
FIG. 8 is a block diagram of a hardware structure of an authentication access controller (AAC) according to an embodiment of the present disclosure.

Referring to FIG. 8, also provided in an embodiment of the present disclosure is an authentication access controller AAC, including: a first processor 801 and a first memory 802. The first processor 801 can invoke, from the first memory 802, and run a computer program so as to implement the operations performed by the AAC in the above embodiments.

The first memory 802 may be a separate device independent of the first processor 801, or may be integrated in the first processor 801.

It should be understood that the authentication access controller may implement the respective processes implemented by the AAC in various methods of the embodiments of the present disclosure, which are not described herein again for brevity.

Figure 9:
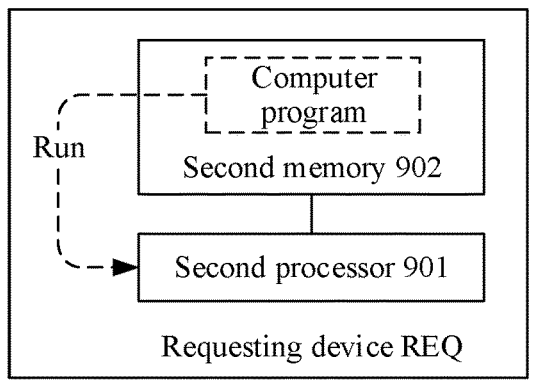
FIG. 9 is a block diagram of a hardware structure of a requesting device (REQ) according to an embodiment of the present disclosure.

Referring to FIG. 9, also provided in an embodiment of the present disclosure is a requesting device REQ, including: a second processor 901 and a second memory 902. The second processor 901 may invoke and run a computer program from the second memory 902 to implement the operations performed by the REQ in the above-mentioned embodiments.

The second memory 902 may be a separate device independent of the second processor 901, or may be integrated in the second processor 901.

It should be understood that the requester may implement the respective processes implemented by the REQ in various methods of the embodiments of the present disclosure, which are not described herein again for brevity.

Also provided in an embodiment of the present disclosure is a computer-readable storage medium, having a computer program stored thereon, the computer program performing, when executed by a processor, operations performed by the authentication access controller AAC or the requesting device REQ in the above identity authentication method. The storage medium may be a volatile or non-volatile computer-readable storage medium.

Also provided in an embodiment of the present disclosure is a computer program, including computer-readable code, where when the computer-readable code is run in an electronic device, a processor in the electronic device performs operations performed by the authentication access controller AAC or the requesting device REQ in the above identity authentication method.

Also provided in an embodiment of the present disclosure is a computer program product, including computer program instructions used to perform operations performed by the authentication access controller AAC or the requesting device REQ in the above identity authentication method. Reference can be made to the above method embodiments, and details will not be described herein again.

When the requesting device and the authentication access controller perform identity verification on the basis of a pre-shared key authentication mechanism, identity information of the requesting device and the authentication access controller is transmitted in the form of a ciphertext during message transmission, so as to ensure that when a verifying party performs identity verification on the basis of the pre-shared key authentication mechanism, identity information of an opposite party can be acquired by decrypting an identity information ciphertext of the opposite party, so that real identity authentication is performed on a verified party. The identity information transmitted between the requesting device and the authentication access controller is present in the form of a ciphertext, so that the identity information of the verified party is prevented from being exposed during transmission, thereby ensuring that an attacker could not acquire private or sensitive information. Mutual or unilateral identity authentication is performed between an authentication access controller and a requesting device by using a pre-shared key, while confidentiality of identity related information of entities is ensured, thereby laying the foundation for ensuring that a user accessing a network is legal and/or a network to be accessed by a user is legal.

Those of ordinary skill in the art can understand that all or some of the operations in the above method embodiments may be implemented via a program instructing relevant hardware. The program may be stored in a computer-readable storage medium. When executed, the program performs the operations in the above method embodiments. The storage medium may be at least one of the following media: a read-only memory (ROM), a RANI, a magnetic disk, an optical disc, or any medium capable of storing program code.

It should be noted that various embodiments in the description are described in a progressive manner, the same and similar parts of each embodiment can be referred to each other, and each embodiment focuses on the differences from other embodiments. In particular, for device and system embodiments, since they are consistent and corresponding to the method embodiments, they are relatively simply described, and please refer to part of the description of the method embodiments for related parts. The apparatus and system embodiments described above are merely illustrative. The portions described as separate components may or may not be physically separated, and the components shown as portions may or may not be physical portions, which may be located in one place or may be distributed onto a plurality of network portions. The objective of the solution of this embodiment may be achieved by selecting some or all of the modules according to actual requirements. A person of ordinary skill in the art can understand and implement the solutions without any inventive effort.

The detailed description of the present disclosure is merely described above, but the scope of protection of the present disclosure is not limited thereto. Any person skilled in the art can easily conceive of changes or substitutions within the technical scope disclosed in the present disclosure, and all of the changes or substitutions should be covered by the scope of protection of the present disclosure. Therefore, the scope of protection of the present disclosure should be defined by the scope of protection of the claims.

INDUSTRIAL APPLICABILITY

Disclosed in an embodiment of the present disclosure is an identity authentication method. When a requesting device and an authentication access controller perform identity verification on the basis of a pre-shared key authentication mechanism, identity information of a verified party is transmitted in the form of a ciphertext, thereby preventing the identity information of the verified party from being directly exposed during transmission, and ensuring that an attacker cannot acquire private or sensitive information. Mutual or unilateral identity authentication is performed between an authentication access controller and a requesting device, while confidentiality of identity related information of entities is ensured, thereby laying the foundation for ensuring that a user accessing a network is legal and/or a network to be accessed by a user is legal. In addition, key exchange calculation and ingenious detail design enhance the capability of the authentication process to resist dictionary brute force attacks or quantum computation attacks. Also disclosed in embodiments of the present disclosure are an authentication access controller, a requesting device, a storage medium, a program, and a program product.

The invention claimed is:

1. A method for identity authentication, comprising:
sending, by a requesting device, a first identity ciphertext message to an authentication access controller, wherein the first identity ciphertext message comprises a first identity information ciphertext generated by using a message encryption key to encrypt information comprising an identifier of the requesting device;
decrypting, by the authentication access controller, the first identity information ciphertext using the message encryption key to obtain the identifier of the requesting device, determining a pre-shared key with the requesting device based on the identifier of the requesting device, and calculating an identity authentication key based on information comprising the pre-shared key and a first key;
sending, by the authentication access controller, a second identity ciphertext message to the requesting device, wherein the second identity ciphertext message comprises a second identity information ciphertext and a second key exchange parameter of the authentication access controller, the second identity information ciphertext being generated by the authentication access controller by using the message encryption key to encrypt information comprising an identifier of the authentication access controller, and the second key exchange parameter of the authentication access controller being generated by using the identity authentication key to encrypt information comprising a second temporary public key generated by the authentication access controller;

decrypting, by the requesting device, the second identity information ciphertext using the message encryption key to obtain the identifier of the authentication access controller, determining a pre-shared key with the authentication access controller based on the identifier of the authentication access controller, and calculating the identity authentication key based on information comprising the pre-shared key and the first key; and sending, by the requesting device, a first authentication message to the authentication access controller, wherein the first authentication message comprises a second key exchange parameter of the requesting device, the second key exchange parameter of the requesting device being generated by the requesting device by using the identity authentication key to encrypt information comprising a second temporary public key generated by the requesting device, wherein at least one of the following applies:

the requesting device is used as a verified party and the first authentication message further comprises a first identity authentication code generated by the requesting device by using the identity authentication key to perform calculation on first specified data comprising the identifier and a second key of the requesting device, the second key being generated by the requesting device by performing key exchange calculation on a second temporary private key corresponding to the second temporary public key of the requesting device and a second temporary public key recovered from the second key exchange parameter of the authentication access controller; and the method further comprises: receiving, by the authentication access controller, the first authentication message, verifying the first identity authentication code using the identity authentication key and the first specified data, and determining an identity authentication result of the requesting device according to a verification result; or the authentication access controller is used as a verified party and the method further comprises: sending, by the authentication access controller, a second authentication message to the requesting device, wherein the second authentication message comprises a second identity authentication code generated by the authentication access controller by using the identity authentication key to perform calculation on second specified data comprising the identifier and a second key of the authentication access controller, the second key being generated by the authentication access controller by performing the key exchange calculation on a second temporary private key corresponding to the second temporary public key of the authentication access controller and a second temporary public key recovered from the second key exchange parameter of the requesting device; and receiving, by the requesting device, the second authentication message, verifying the second identity authentication code using the identity authentication key and the second specified data, and determining an identity authentication result of the authentication access controller according to a verification result.

2. The method of claim 1, wherein the first key is negotiated by the requesting device and the authentication access controller in the following manner:

sending, by the authentication access controller, a key negotiation request message to the requesting device, wherein the key negotiation request message comprises a first key exchange parameter generated by the authentication access controller, and the first key exchange parameter of the authentication access controller comprises a first temporary public key generated by the authentication access controller;

performing, by the requesting device, the key exchange calculation on a first temporary private key corresponding to a first temporary public key of the requesting device and the first temporary public key of the authentication access controller to obtain the first key, and the first identity ciphertext message further comprising a first key exchange parameter of the requesting device, the first key exchange parameter of the requesting device comprising the first temporary public key generated by the requesting device, and performing, by the authentication access controller, the key exchange calculation on a first temporary private key corresponding to the first temporary public key of the authentication access controller and the first temporary public key of the requesting device to obtain the first key.

3. The method of claim 2, wherein the message encryption key is negotiated and generated by the requesting device and the authentication access controller in the following manner:

calculating, by the requesting device, the message encryption key based on calculation information comprising the first key and by using a key derivation algorithm; and correspondingly, calculating, by the authentication access controller, the message encryption key based on calculation information comprising the first key and by using the key derivation algorithm.

4. The method of claim 3, wherein the key negotiation request message further comprises a first nonce generated by the authentication access controller, and the calculation information used by the requesting device to calculate the message encryption key further comprises the first nonce and a second nonce generated by the requesting device, and correspondingly, the first identity ciphertext message further comprises the second nonce, and the calculation information used by the authentication access controller to calculate the message encryption key further comprises the first nonce and the second nonce.

5. The method of claim 4, further comprising: before calculating, by the authentication access controller, the message encryption key, verifying, by the authentication access controller, consistency between a first nonce in the first identity ciphertext message and the first nonce generated by the authentication access control; and calculating, by the authentication access controller, the message encryption key in response to the verification being successful.

6. The method of claim 4, wherein at least one of the following applies:

the second identity ciphertext message further comprises at least one of the first nonce or the second nonce, after receiving the second identity ciphertext message, performing, by the requesting device, at least one of the following: verifying consistency between the first nonce in the second identity ciphertext message and the first nonce in the key negotiation request message, or verifying consistency between the second nonce in the second identity ciphertext message and the second nonce generated by the requesting device; and decrypting, by the requesting device, the second identity information ciphertext to obtain the identifier of the authentication access controller in response to the verification being successful;

the first authentication message further comprises at least one of the first nonce or the second nonce, after receiving the first authentication message, performing, by the authentication access controller, at least one of the following: verifying consistency between the first nonce in the first authentication message and the first nonce generated by the authentication access controller, or verifying consistency between the second nonce in the first authentication message and the second nonce in the first identity ciphertext message; and acquiring, by the authentication access controller, the second key exchange parameter of the requesting device in response to the verification being successful; or the second authentication message further comprises at least one of the first nonce or the second nonce, after receiving the second authentication message, performing, by the requesting device, at least one of the following: verifying consistency between the first nonce in the second authentication message and the first nonce in the key negotiation request message, or verifying consistency between the second nonce in the second authentication message and the second nonce generated by the requesting device; and verifying, by the requesting device, the second identity authentication code in response to the verification being successful.

7. The method of claim 2, wherein the key negotiation request message further comprises security capability parameter information supported by the authentication access controller, and the method further comprises:

determining, by the requesting device based on the security capability parameter information, a particular security policy to be used by the requesting device, so that the first identity ciphertext message of the requesting device further comprises the particular security policy.

8. The method of claim 3, wherein in response to determining that the message encryption key is calculated by using the key derivation algorithm, a message integrity check key is further derived, and the method further comprises at least one of the following:

the second identity ciphertext message further comprises a first message integrity check code generated by the authentication access controller by using the message integrity check key and an integrity check algorithm to perform calculation on other fields, except the first message integrity check code, in the second identity ciphertext message, after receiving the second identity ciphertext message, verifying, by the requesting device, the first message integrity check code using the message integrity check key, and decrypting the second identity information ciphertext using the message encryption key to obtain the identifier of the authentication access controller in response to the verification being successful; or the first authentication message further comprises a second message integrity check code generated by the requesting device by using the message integrity check key and the integrity check algorithm to perform calculation on other fields, except the second message integrity check code, in the first authentication message, after receiving the first authentication message, verifying, by the authentication access controller, the second message integrity check code using the message integrity check key, and verifying, in response to the verification being successful, the first identity authentication code in response to determining that the requesting device is the verified party.

9. The method of claim 1, further comprising:

calculating, by the requesting device, a session key based on information comprising the second key, the identifier of the requesting device, and the identifier of the authentication access controller according to a key derivation algorithm; and calculating, by the authentication access controller, a session key based on information comprising the second key, the identifier of the requesting device, and the identifier of the authentication access controller, according to the key derivation algorithm.

10. The method of claim 1, wherein the requesting device is used as the verified party, and the authentication access controller is used as a verifying party; and the authentication access controller is used as the verified party, and the requesting device is used as the verifying party, wherein in response to determining that the requesting device and the authentication access controller mutually verify that the identity of each other is legal, the method further comprises:

calculating, by the requesting device based on information comprising the second key and the identity authentication key and by using a key derivation algorithm, a pre-shared key to be used in a next identity authentication; and calculating, by the authentication access controller based on information comprising the second key and the identity authentication key and by using the key derivation algorithm, a pre-shared key to be used in a next identity authentication.

11. The method of claim 1 wherein a message sent by the requesting device to the authentication access controller further comprises a hash value calculated by the requesting device for a received latest preceding message sent by the authentication access controller, after receiving the message sent by the requesting device, verifying, by the authentication access controller, the hash value in the received message, and performing a subsequent operation in response to the verification being successful; and wherein a message sent by the authentication access controller to the requesting device further comprises a hash value calculated by the authentication access controller for a received latest preceding message sent by the requesting device, after receiving the message sent by the authentication access controller, verifying, by the requesting device, the hash value in the received message, and performing a subsequent operation in response to the verification being successful.

12. An authentication access controller, comprising:
a processor; and
a memory for storing instructions executable by the processor,
wherein the processor is configured to call the instructions stored in the memory to perform operations comprising:

receiving a first identity ciphertext message from a requesting device, wherein the first identity ciphertext message comprises a first identity information ciphertext generated by using a message encryption key to encrypt information comprising an identifier of the requesting device;

decrypting the first identity information ciphertext using the message encryption key to obtain the identifier of the requesting device, determining a pre-shared key with the requesting device based on the identifier of the requesting device, and calculating an identity authentication key based on information comprising the pre-shared key and a first key; and sending a second identity ciphertext message to the requesting device, wherein the second identity ciphertext message comprises a second identity information ciphertext and a second key exchange parameter of the authentication access controller, the second identity information ciphertext being generated by the authentication access controller by using the message encryption key to encrypt information comprising an identifier of the authentication access controller, and the second key exchange parameter of the authentication access controller being generated by using the identity authentication key to encrypt information comprising a second temporary public key generated by the authentication access controller, wherein the processor is further configured to receive a first authentication message from the requesting device, wherein the first authentication message comprises a second key exchange parameter of the requesting device, the second key exchange parameter of the requesting device being generated by the requesting device by using the identity authentication key to encrypt information comprising a second temporary public key generated by the requesting device, and wherein at least one of the following applies:
the requesting device is used as a verified party and the first authentication message further comprises a first identity authentication code generated by the requesting device by using the identity authentication key to perform calculation on first specified data comprising the identifier and a second key of the requesting device, the second key being generated by the requesting device by performing key exchange calculation on a second temporary private key corresponding to the second temporary public key of the requesting device and a second temporary public key recovered from the second key exchange parameter of the authentication access controller, wherein the processor is further configured to verify the first identity authentication code in the first authentication message using the identity authentication key and the first specified data, and determine an identity authentication result of the requesting device according to a verification result; or the authentication access controller is used as a verified party and the processor is further configured to send a second authentication message to the requesting device, wherein the second authentication message comprises a second identity authentication code generated by the authentication access controller by using the identity authentication key to perform calculation on second specified data comprising the identifier and a second key of the authentication access controller, the second key being generated by the authentication access controller by performing the key exchange calculation on a second temporary private key corresponding to the second temporary public key of the authentication access controller and a second temporary public key recovered from the second key exchange parameter of the requesting device.

13. A requesting device, comprising:
a processor; and
a memory for storing instructions executable by the processor,
wherein the processor is configured to call the instructions stored in the memory to perform operations comprising:
sending a first identity ciphertext message to an authentication access controller, wherein the first identity ciphertext message comprises a first identity information ciphertext generated by using a message encryption key to encrypt information comprising an identifier of the requesting device;
receiving a second identity ciphertext message from the authentication access controller, wherein the second identity ciphertext message comprises a second identity information ciphertext and a second key exchange parameter of the authentication access controller, the second identity information ciphertext being generated by the authentication access controller by using the message encryption key to encrypt information comprising an identifier of the authentication access controller, and the second key exchange parameter of the authentication access controller being generated by using an identity authentication key to encrypt information comprising a second temporary public key generated by the authentication access controller; and
decrypting the second identity information ciphertext using the message encryption key to obtain the identifier of the authentication access controller, determining a pre-shared key with the authentication access controller based on the identifier of the authentication access controller, and calculating the identity authentication key based on information comprising the pre-shared key and a first key,
wherein the processor is further configured to send a first authentication message to the authentication access controller, wherein the first authentication message comprises a second key exchange parameter of the requesting device, the second key exchange parameter of the requesting device being generated by the requesting device by using the identity authentication key to encrypt information comprising a second temporary public key generated by the requesting device; and
wherein at least one of the following applies:
the requesting device is used as a verified party and the first authentication message further comprises a first identity authentication code generated by the requesting device by using the identity authentication key to perform calculation on first specified data comprising the identifier and a second key of the requesting device, the second key being generated by the requesting device by performing key exchange calculation on a second temporary private key corresponding to the second temporary public key of the requesting device and a second temporary public key recovered from the second key exchange parameter of the authentication access controller; or the authentication access controller is used as a verified party and the processor is further configured to receive a second authentication message from the authentication access controller, wherein the second authentication message comprises a second identity authentication code generated by the authentication access controller by using the identity authentication key to perform calculation on second specified data comprising the identifier and a second key of the authentication access controller, the second key being generated by the authentication access controller by performing the key exchange calculation on a second temporary private key corresponding to the second temporary public key of the authentication access controller and a second temporary public key recovered from the second key exchange parameter of the requesting device; and the processor is further configured to verify the second identity authentication code in the second authentication message using the identity authentication key and the second specified data, and determine an identity authentication result of the authentication access controller according to a verification result.

14. The requesting device of claim 13, wherein the processor is further configured to:
receive a key negotiation request message from the authentication access controller, wherein the key negotiation request message comprises a first key exchange parameter generated by the authentication access controller, the first key exchange parameter of the authentication access controller comprising a first temporary public key generated by the authentication access controller, and
perform the key exchange calculation on a first temporary private key corresponding to a first temporary public key of the requesting device and the first temporary public key of the authentication access controller to generate the first key, a first key exchange parameter of the requesting device comprising the first temporary public key generated by the requesting device, and
the first identity ciphertext message sent by the processor further comprises the first key exchange parameter of the requesting device.

15. The requesting device of claim 14, wherein the processor is further configured to calculate the message encryption key based on calculation information comprising the first key and by using a key derivation algorithm.

16. The requesting device of claim 15, wherein the key negotiation request message further comprises a first nonce generated by the authentication access controller, and the calculation information used by the processor to calculate the message encryption key further comprises the first nonce and a second nonce generated by the requesting device, and
correspondingly, the first identity ciphertext message sent by the processor further comprises the second nonce;
wherein the first identity ciphertext message sent by the processor further comprises the first nonce;
wherein at least one of the following applies:
the second identity ciphertext message further comprises at least one of the first nonce or the second nonce, the processor is further configured to perform at least one of the following: verifying consistency between the first nonce in the second identity ciphertext message and the first nonce in the key negotiation request message, or verifying consistency between the second nonce in the second identity ciphertext message and the second nonce generated by the requesting device, and the processor is further configured to decrypt the second identity information ciphertext to obtain the identifier of the authentication access controller in response to the verification being successful; or
the second authentication message further comprises at least one of the first nonce or the second nonce, the processor is further configured to perform at least one of the following: verifying consistency between the first nonce in the second authentication message and the first nonce in the key negotiation request message, or verifying consistency between the second nonce in the second authentication message and the second nonce generated by the requesting device, and the processor is configured to verify the second identity authentication code in response to the verification being successful.

17. The requesting device of claim 15, wherein in response to determining that the processor calculates the message encryption key by using the key derivation algorithm, a message integrity check key is further derived, and wherein at least one of the following applies:
the second identity ciphertext message further comprises a first message integrity check code, the processor is further configured to verify the first message integrity check code using the message integrity check key, and decrypt the second identity information ciphertext using the message encryption key to obtain the identifier of the authentication access controller in response to the verification being successful; or
the first authentication message further comprises a second message integrity check code generated by the processor by using the message integrity check key and an integrity check algorithm to perform calculation on other fields, except the second message integrity check code, in the first authentication message.

18. The requesting device of claim 13, wherein the processor is further configured to calculate a session key based on information comprising the second key, the identifier of the requesting device, and the identifier of the authentication access controller according to a key derivation algorithm.

19. The requesting device of claim 13, wherein the requesting device is used as the verified party, and the authentication access controller is used as a verifying party; and the authentication access controller is used as the verified party, and the requesting device is used as the verifying party,
wherein in response to determining that the requesting device and the authentication access controller mutually verify that the identity of each other is legal, the processor is further configured to calculate, based on information comprising the second key and the identity authentication key and by using a key derivation algorithm, a pre-shared key to be used in a next identity authentication.

20. The requesting device of claim 13, wherein a message sent by the requesting device to the authentication access controller further comprises a hash value calculated by the requesting device for a received latest preceding message sent by the authentication access controller.

* * * * *